(12) United States Patent
Gohng et al.

(10) Patent No.: US 8,987,620 B2
(45) Date of Patent: *Mar. 24, 2015

(54) HAPTIC STEERING WHEEL SWITCH APPARATUS

(75) Inventors: Jun-ho Gohng, Seongnam-si (KR); Lee-Hwa Jung, Hwaseong-si (KR); Dae Woo Kwon, Suwon-si (KR); Jin Young Lee, Ansan-si (KR); Su Young Ahn, Anyang-si (KR); Jung Hoo Bae, Ansan-si (KR)

(73) Assignee: Daesung Electric Co., Ltd., Gyeonggi-Do (KR)

( * ) Notice: Subject to any disclaimer, the term of this patent is extended or adjusted under 35 U.S.C. 154(b) by 106 days.

This patent is subject to a terminal disclaimer.

(21) Appl. No.: 13/455,496

(22) Filed: Apr. 25, 2012

(65) Prior Publication Data

US 2012/0267222 A1 Oct. 25, 2012

(30) Foreign Application Priority Data

Apr. 25, 2011 (KR) .................. 10-2011-0038250
Apr. 25, 2011 (KR) .................. 10-2011-0038251
Mar. 30, 2012 (KR) .................. 10-2012-0033411

(51) Int. Cl.
*H01H 9/00* (2006.01)
*G06F 7/00* (2006.01)
*G06F 3/01* (2006.01)
(Continued)

(52) U.S. Cl.
CPC .............. *G06F 3/016* (2013.01); *G06F 3/0338* (2013.01); *G06F 3/0362* (2013.01)
USPC ............................ 200/61.54; 701/41; 701/42

(58) Field of Classification Search
USPC ............... 701/44, 41–42; 180/400; 200/61.54
See application file for complete search history.

(56) References Cited

U.S. PATENT DOCUMENTS

| 5,746,071 A | 5/1998 | Youn |
| 5,855,144 A | 1/1999 | Parada |

(Continued)

FOREIGN PATENT DOCUMENTS

| EP | 1575017 A1 | 9/2005 |
| EP | 1 769 963 A2 | 4/2007 |

(Continued)

OTHER PUBLICATIONS

English-language Abstract of Korean Patent Document No. 1997-0040790 dated Jul. 24, 1997, 1 page.

*Primary Examiner* — Helal A Algahaim
*Assistant Examiner* — Nga X Nguyen
(74) *Attorney, Agent, or Firm* — Rabin & Berdo, P.C.

(57) ABSTRACT

The present invention provides haptic steering wheel switch apparatus including: a haptic wheel housing unit disposed on a steering wheel of a vehicle; a circuit board unit disposed in the haptic wheel housing unit; and a haptic wheel device unit including a haptic wheel device actuator establishing an electrical connection with the circuit board unit and including a haptic shaft, a haptic knob connected to the haptic shaft and exposedly disposed on one surface of the haptic wheel housing unit, and a haptic wheel device sensing unit for detecting a rotating state of the haptic shaft, wherein the haptic knob achieves a rotary operation on a plane formed by the steering wheel of the vehicle, the haptic wheel device actuator moves in a longitudinal direction of the haptic shaft, and a button switch unit operating vertically and independently of the haptic knob is provided outside the haptic knob.

11 Claims, 15 Drawing Sheets

(51) Int. Cl.
*G06F 3/0338* (2013.01)
*G06F 3/0362* (2013.01)

(56) References Cited

U.S. PATENT DOCUMENTS

| | | | |
|---|---|---|---|
| 6,636,197 B1 * | 10/2003 | Goldenberg et al. | 345/156 |
| 6,703,999 B1 * | 3/2004 | Iwanami et al. | 345/158 |
| 6,852,936 B2 | 2/2005 | Hayashi et al. | |
| 6,876,313 B2 | 4/2005 | Hsiung et al. | |
| 7,439,459 B2 | 10/2008 | Hyun et al. | |
| 7,441,800 B2 | 10/2008 | Weber et al. | |
| 7,680,574 B2 | 3/2010 | Berg et al. | |
| 2005/0018172 A1 | 1/2005 | Gelfond et al. | |
| 2006/0155441 A1* | 7/2006 | Berg et al. | 701/41 |
| 2006/0271261 A1 | 11/2006 | Flores et al. | |
| 2010/0200375 A1* | 8/2010 | Han et al. | 200/61.54 |
| 2013/0038431 A1* | 2/2013 | Springer et al. | 340/407.1 |

FOREIGN PATENT DOCUMENTS

| | | |
|---|---|---|
| EP | 2447971 A1 | 5/2012 |
| JP | 61-003637 U | 1/1986 |
| JP | 2-19656 | 2/1990 |
| JP | 9-161612 | 6/1997 |
| JP | 10-334771 A | 12/1998 |
| JP | 10-340152 | 12/1998 |
| JP | 2001-345031 | 12/2001 |
| JP | 2003-22137 | 1/2003 |
| JP | 2003-050639 | 2/2003 |
| JP | 2003-063326 | 3/2003 |
| JP | 2003-327059 | 11/2003 |
| JP | 2004-146090 | 5/2004 |
| JP | 2004-185976 | 7/2004 |
| JP | 2004-228022 | 8/2004 |
| JP | 2004-537452 | 12/2004 |
| JP | 2007-234482 | 9/2007 |
| JP | 2007-326490 A | 12/2007 |
| JP | 2008-047370 | 2/2008 |
| JP | 2008-170766 | 7/2008 |
| JP | 2008-233344 | 10/2008 |
| JP | 2009-519855 | 5/2009 |
| JP | 2010-010023 A | 1/2010 |
| JP | 2010-244899 | 10/2010 |
| JP | 2010-540320 | 12/2010 |
| JP | 2012-230901 A | 11/2012 |
| KR | 1997-0040790 A | 7/1997 |
| KR | 10-2004-0106162 | 12/2004 |
| KR | 2007-0026259 A | 3/2007 |
| KR | 10-0877067 | 12/2008 |
| KR | 10-2009-0084945 | 8/2009 |
| KR | 10-2009-128163 | 12/2009 |
| WO | WO 03/012557 A2 | 2/2003 |
| WO | WO-2006-013470 A2 | 2/2006 |
| WO | WO-2010/150933 A1 | 12/2010 |

* cited by examiner

HAPTIC STEERING WHEEL SWITCH APPARATUS

CROSS-REFERENCE TO RELATED APPLICATIONS

The present application is related to a patent application which has been filed by the same Applicant, i.e., U.S. Utility patent application entitled "HAPTIC STEERING WHEEL SWITCH DEVICE AND HAPTIC STEERING WHEEL SWITCH SYSTEM INCLUDING THE SAME," filed on Mar. 25, 2010, and bearing a Ser. No. 12/680,198, and U.S. Utility patent application entitled "HAPTIC STEERING WHEEL SWITCH APPARATUS AND HAPTIC STEERING WHEEL SWITCH SYSTEM INCLUDING THE SAME," filed on Dec. 22, 2011, and bearing a Ser. No. 13/334,145. Also, This application claims the benefit of Korean Patent Application No. 10-2011-0038250, filed on Apr. 25, 2011, Korean Patent Application No. 10-2011-0038251, filed on Apr. 25, 2011, and Korean Patent Application No. 10-2012-0033411, filed on Mar. 30, 2012 in the Korean Intellectual Property Office, which is incorporated herein by reference in its entirety.

BACKGROUND OF THE INVENTION

1. Field of the Invention

The present invention relates to a switch device, and more particularly to such a switch device having a simple structure, which achieves a smooth operation upon the steering of the wheel by a driver, allows the driver to make a quick perception, and allows for multidirectional handling and push operation so that a variety of operating modes can be selected for the device.

2. Background of the Related Art

A switch device is used as a device for selection and manipulation for apparatuses such as vehicles, machine tools, terminals, multimedia devices, game machines, and the like. Nevertheless, a variety of researches and developments are also in progress on a switch device for diverse functional selections of the apparatuses. Examples of such a switch device include a rotary switch enabling axial rotation besides a button switch of a simple push switch type. In addition, a variety of researches and productions are performed on a rotary switch having diverse modified structures.

In the meantime, since a target manipulated by a switch device has complicated and various functions, the switch device requires a function for selecting a combined hierarchical operation and enables a hierarchical operating function through a stepwise operation. Such a conventional switch device, however, entails an drawback in that it merely has a construction in which a light source for irradiating an illuminating light is disposed at an icon arranged on a switch knob of the switch device and in that since it does not perform active display functions corresponding to various operating modes, a user suffers from an inconvenience of having to watch a separate display screen. That is, the conventional switch device involves a problem in that since the user has to simultaneously watch the switch knob of the switch device and the display screen to manipulate the switch device, manipulation of the switch device is inconvenient or a driver's driving attention is diverted in case of a switch device mounted at a vehicle, thereby decreasing the driving safety of the vehicle. In addition, another conventional switch device has an electrostatic capacity type switch structure in which the display device and the switch device are integrated with each other. However, a conventional touch switch has a weak responsiveness to manipulation thereof, and thus a user does not feel a direct manipulation feeling.

SUMMARY OF THE INVENTION

Accordingly, it is an object of the present invention to provide a haptic steering wheel switch apparatus with a simple structure, which is mounted on a steering wheel of a vehicle, has a compact size, can remarkably reduce the manufacturing cost, and improves the manipulating property thereof.

To achieve the above object, in one aspect, the present invention provides a haptic steering wheel switch apparatus, including: a haptic wheel housing unit configured to be disposed on a vehicle steering wheel; a circuit board unit configured to be disposed inside the haptic wheel housing unit; and a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, the haptic knob may achieve a rotary operation on plane on which the vehicle steering wheel is arranged and the haptic wheel device actuator is moved vertically in a longitudinal direction of the haptic shaft.

In the haptic steering wheel switch apparatus, the haptic shaft of the haptic wheel device actuator may include a first end and a second end respectively formed at both ends thereof.

In the haptic steering wheel switch apparatus, the haptic knob may be connected with the first end of the haptic shaft and the haptic wheel device sensing unit is connected with the second end of the haptic shaft.

In the haptic steering wheel switch apparatus, a shaft knob holder may be disposed between the haptic knob and the first end of the haptic shaft to prevent the relative rotation between the haptic knob and the first end.

In the haptic steering wheel switch apparatus, a shaft sensing holder may be disposed between the haptic wheel device sensing unit and the second end of the haptic shaft to prevent the relative rotation between the haptic wheel device sensing unit and the second end.

In the haptic steering wheel switch apparatus, the haptic wheel device sensing unit may comprise a device sensing body part connected with the haptic wheel device actuator, and a device detecting sensor part configured to detect the rotation state of the device sensing body part, wherein the device sensing body part comprises: a device sensing main pulley connected with the shaft sensing holder in such a fashion that the relative rotation between the device sensing main pulley and the shaft sensing holder 314 is restricted; a device sensing sub-pulley connected with the device sensing main pulley in such a fashion as to be spaced apart from the device sensing main pulley; a device sensing belt configured to interconnect the device sensing main pulley and the device sensing sub-pulley; and a device slot connected to the device sensing sub-pulley and configured to be rotated together with the device sensing sub-pulley when the device sensing sub-pulley is rotated, the device slot being rotatably disposed at a position corresponding to the device detecting sensor part.

In the haptic steering wheel switch apparatus, a rotation ratio of the device sensing main pulley to the device sensing sub-pulley may be more than 1.

The haptic steering wheel switch apparatus may further comprise a push switch unit configured to generate a switching signal when the haptic knob is moved vertically in the longitudinal direction of the haptic shaft.

In the haptic steering wheel switch apparatus, the push switch unit may comprise: a push switch disposed on the circuit board unit; and a push switch operating part configured to be moved vertically together with the haptic wheel device actuator.

In the haptic steering wheel switch apparatus, the push switch may be provided in plural numbers.

In the haptic steering wheel switch apparatus, the haptic wheel device sensing unit may be moved vertically together with the haptic wheel device actuator.

In the haptic steering wheel switch apparatus, the haptic knob may be formed of a light-transmitting material, the circuit board unit comprises a knob board configured to allow the first end of the haptic shaft to pass therethrough and serve as an end of the haptic wheel device actuator, and a haptic knob light source unit is mounted on the knob board to output light.

In the haptic steering wheel switch apparatus, a button switch unit may be disposed at an outside of the haptic knob so that it is operated vertically independently of the haptic knob.

In the haptic steering wheel switch apparatus, the button switch unit may comprise: a button knob configured to be disposed on the outside of the haptic knob in such a fashion as to be exposed at one surface thereof to the outside of the haptic wheel housing unit; a button guide configured to be disposed at one end thereof within the button knob and disposed at the other end thereof within the haptic wheel housing unit toward the circuit board unit; a button guide holder configured to be attached to the button guide and disposed in the haptic wheel housing unit in a vertically stable movable manner together with the button guide; and a button switch configured to be disposed on one surface of the circuit board unit in such a fashion as to be brought into close contact with the button guide holder. In the haptic steering wheel switch apparatus, the button guide holder may comprise a button guide holder stopper formed on one side thereof, and the haptic wheel housing unit comprises a wheel housing body stopper formed thereon in such a fashion as to come into close contact with the button guide holder stopper to correspond to the button guide holder stopper so that the button guide holder is prevented from being separated and escaping from the wheel housing body of the haptic wheel housing unit.

In the haptic steering wheel switch apparatus, the btton guide holder may comprise a button guide holder operating part configured to operate the button switch. In the haptic steering wheel switch apparatus, the button switch unit may further comprise a button light source unit, and the button guide is formed of a light guide material.

In the haptic steering wheel switch apparatus, the button guide holder operating part may comprise a button guide holder operating part seating face formed on one surface thereof so that it comes close contact with the button guide to support the button guide.

In the haptic steering wheel switch apparatus, the a button color filter may be disposed between the button guide and the button knob to transmit only light having a predetermined frequency band.

In the haptic steering wheel switch apparatus, the haptic knob may comprise a haptic knob dimple formed in a concave shape on one surface thereof, the haptic knob dimple having a structure in which a dimple depth formed in a direction perpendicular to the rotation center of the haptic knob is gradually decreased as it goes toward a radial direction from the center of the haptic knob.

In the haptic steering wheel switch apparatus, the haptic knob may comprise a haptic knob grip formed protrudingly on one surface thereof.

In the haptic steering wheel switch apparatus, the haptic knob may comprise a haptic knob contact surface formed in a dual injection manner on a top thereof to increase a contact frictional force between the driver's finger and the haptic knob.

The haptic steering wheel switch apparatus may further comprise a control unit configured to establish an electrical connection with the haptic steering wheel switch apparatus; and a storage unit configured to to establish an electrical connection with the control unit and store predetermined data for a predetermined operating mode.

To achieve the above object, in other aspect, the present invention provides a haptic steering wheel switch apparatus, including: a haptic wheel housing unit disposed on a steering wheel of a vehicle; a circuit board unit disposed in the haptic wheel housing unit; and a haptic wheel device unit including a haptic wheel device actuator establishing an electrical connection with the circuit board unit and including a haptic shaft, a haptic knob connected to the haptic shaft and exposedly disposed on one surface of the haptic wheel housing unit, and a haptic wheel device sensing unit for detecting a rotating state of the haptic shaft, wherein the haptic knob achieves a rotary operation on a plane formed by the steering wheel of the vehicle, the haptic wheel device actuator moves in a longitudinal direction of the haptic shaft, and a button switch unit operating vertically and independently of the haptic knob is provided outside the haptic knob.

In the haptic steering wheel switch apparatus, the button switch unit comprises: a button knob disposed outside the haptic knob which is disposed to expose one surface thereof to outside of the haptic wheel housing unit; a button guide, one end of which is disposed inside the button knob and the other end of which is disposed inside the haptic wheel housing unit toward the circuit board unit; a button guide holder attached to the button guide and disposed in the haptic wheel housing unit to be vertically moved together with the button guide; and a button switch including a button switch magnet disposed in the button guide holder, a button switch magnetic sensor disposed on one surface of the circuit board unit to be spaced apart from the button switch magnet, and a button switch elastic unit for elastically supporting the button guide.

In the haptic steering wheel switch apparatus, the button switch unit further comprises a button light source unit disposed on the circuit board unit, and the button guide is formed of a light guide material.

In the haptic steering wheel switch apparatus, the button light source unit comprises a first wavelength light source for outputting a first wavelength light and a second wavelength light source for outputting a second wavelength light of a wavelength band different from a wavelength band of the first wavelength light, and the button switch unit further comprises a button optical filter unit for selectively passing the first wavelength light or the second wavelength light and indicating a variable symbol by changing an output region of light depending on an operation of the button light source unit.

In the haptic steering wheel switch apparatus, the button optical filter unit comprises: a button screening filter unit disposed to face the button light source unit and selectively allowing passage of the first wavelength light or the second wavelength light; and a button translucent filter unit positioned to dispose the button screening filter unit between the button translucent filter unit and the button light source unit and changing an output region of light depending on the first wavelength light or the second wavelength light passing through the button screening filter unit.

In the haptic steering wheel switch apparatus, the button screening filter unit comprises: a button light total penetrating unit for passing both the first wavelength light and the second wavelength light; a button selective light penetrating unit for passing either of the first wavelength light or the second wavelength light; and a button light total blocking unit for blocking both the first wavelength light and the second wavelength light.

In the haptic steering wheel switch apparatus, the button translucent filter unit comprises: a button symbol penetrating unit for providing an at least partial intersecting projection region together with the button light total penetrating unit and passing both the first wavelength light and the second wavelength light; and a button symbol expandable unit formed outside the button symbol penetrating unit, in which transmittance of the first wavelength light and the second wavelength light is smaller than transmittance of the button symbol penetrating unit.

The haptic steering wheel switch apparatus may further comprises; a control unit establishing an electrical connection with the circuit board unit and connected to the haptic wheel device unit and the button switch unit; a storage unit establishing an electrical connection with the control unit and storing predetermined data for a predetermined operating mode; and an arithmetic and logic unit electrically connected to the control unit and the storage unit and executing an arithmetic and logic process needed for a predetermined operating mode according to an arithmetic control signal of the control unit.

In the haptic steering wheel switch apparatus, the control unit determines whether or not to block a signal outputted from the haptic wheel device unit or the button switch unit based on signals received from a vehicle speed sensor for sensing a driving speed of the vehicle and a steering angle sensor for sensing a rotating angle of the steering wheel of the vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Now, a haptic steering wheel switch apparatus and a haptic steering wheel switch system including the same according to the preferred embodiments of the present invention will be described hereinafter in more detail with reference to the accompanying drawings.

The haptic steering wheel switch apparatus 10 according to one embodiment of the present invention is mounted on a steering wheel 2 of a vehicle so that a driver manipulates the switch device more easily, a haptic sensation is applied to the driver, and a physical warning function is executed, thereby improving the driver's attention and convenience in use.

The steering wheel 2 of a vehicle can include a wheel rim 2A and a wheel hub 2B and 2C. The wheel rim 2A is connected with a wheel hub body 2B through a wheel spoke 2C. In this embodiment, although the wheel rim is constructed in a ring type, it may be constructed in various manners within a range of enabling the driver to form a contact region for steering the wheel, but not limited thereto.

The haptic steering wheel switch apparatus 10 is disposed on the wheel hub body 2B, but it may be disposed in various manners within a range of implementing a thumb-wheel type structure to enable the driver to manipulate the switch device simply and easily.

Figure 1:
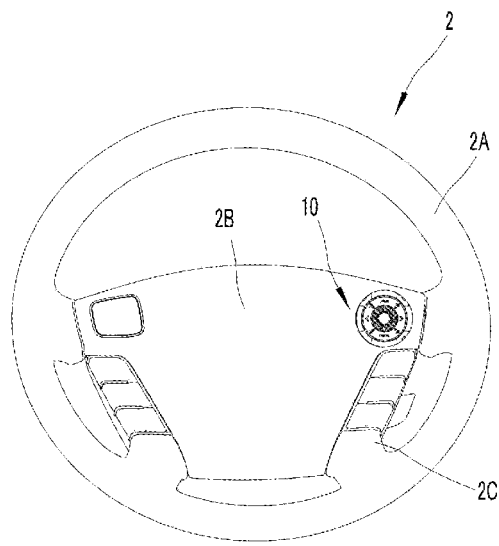
FIG. 1 is a schematic top plan view illustrating a steering wheel on which a haptic steering wheel switch apparatus according to one embodiment of the present invention is mounted.
Figure 2:
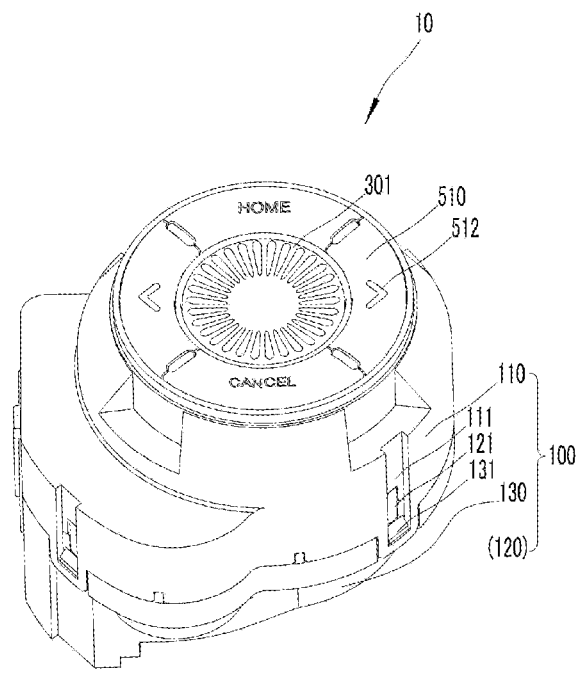
FIG. 2 is a schematic perspective view illustrating a haptic steering wheel switch apparatus according to one embodiment of the present invention.
Figure 3:
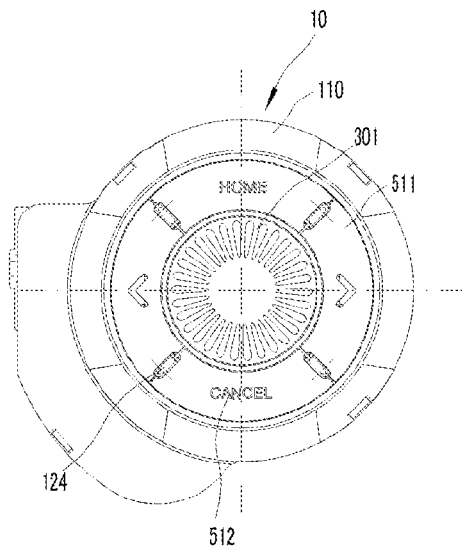
FIG. 3 is a schematic top plan view illustrating a haptic steering wheel switch apparatus according to one embodiment of the present invention.
Figure 6:
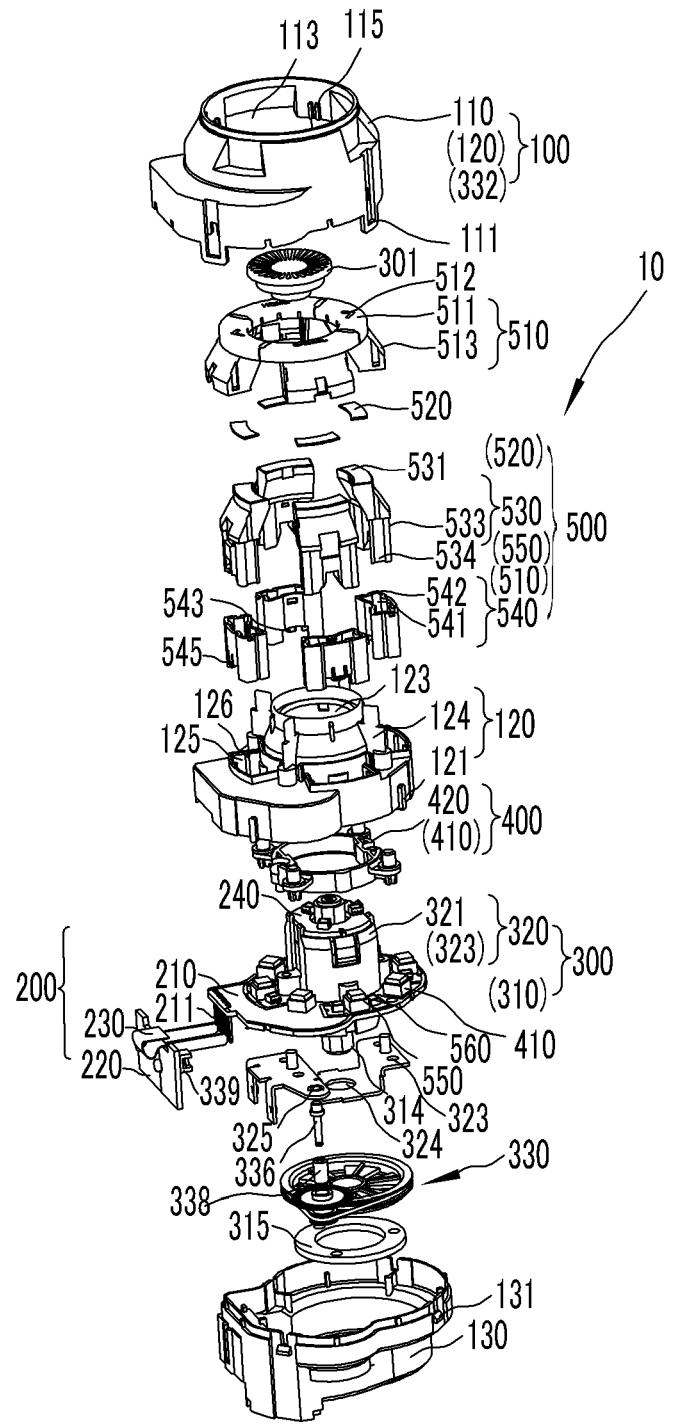
FIG. 6 is a schematic exploded perspective view illustrating a haptic steering wheel switch apparatus according to one embodiment of the present invention.
Figure 7:
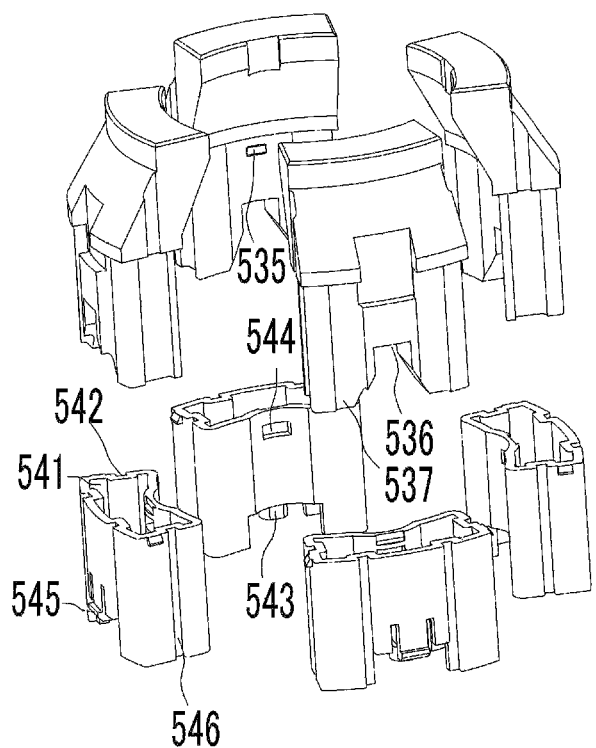
FIG. 7 is a schematic perspective view illustrating a button switch unit of a haptic steering wheel switch apparatus according to one embodiment of the present invention.
Figure 8:
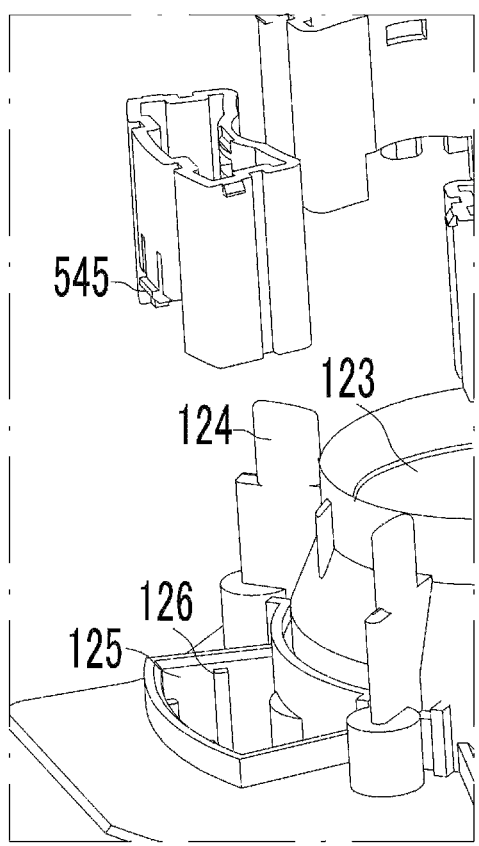
FIG. 8 is a schematic partial enlarged perspective view illustrating a button guide holder and a wheel housing body of a button switch unit of a haptic steering wheel switch apparatus according to one embodiment of the present invention.

More specifically, the haptic steering wheel switch apparatus 10 includes a haptic wheel housing unit 100 (see FIG. 2), a circuit board unit 200 (see FIG. 4 and FIG. 6), and a haptic wheel device 300 (see FIG. 6). The circuit board unit 200 and the haptic wheel device 300 are stably mounted in the haptic wheel housing unit 100.

The haptic wheel housing unit 100 is stably and securely disposed on the vehicle steering wheel 2, more specifically on the wheel hub body 2B in this embodiment. The haptic wheel housing unit 10 includes a wheel housing cover 110, a wheel housing body 120, and a wheel housing base 130. The wheel housing cover 110, the wheel housing body 120, and the wheel housing base 130 are engaged with each other to define an inner space to accommodate other constituent elements.

The wheel housing cover 110 has a through-hole 113 formed therein so that the haptic wheel device 300, which will be described later, is penetratingly disposed in the wheel housing cover 110 through the through-hole 113. The wheel housing cover 110 includes a wheel housing cover mounting part 111 formed at one side end thereof. The wheel housing cover mounting part 111 has a structure in which it is engaged with the wheel housing body 120 which will be described later and/or the wheel housing base 130.

As shown in FIG. 6, button knob guides 115 are formed on the inner periphery of the through-hole 113 of the wheel housing cover 110 so that a button knob 510 of a button switch unit 500, which will be described later, can vertically move stably.

The wheel housing body 120 is disposed so as to abut against the wheel housing cover 110, and includes a through-hole 123. The through-hole 123 is connected with the through-hole 113 to establish a stable connection of the haptic wheel device 300. The wheel housing body 120 includes a wheel housing body mounting part 121 formed on an outside thereof so that the wheel housing body mounting part 121 is engaged with the wheel housing cover mounting part 111 to ensure a stable engagement between the wheel housing cover 110 and the wheel housing body 120.

The wheel housing body 120 includes a barrier rib 124 formed on an upper portion thereof in such a fashion as to extend radially from the outer circumference of the through-hole 123. The barrier rib 124 serves to guide a stable vertical movement of the button knob 510, which will be described later. The barrier rib 124 may be formed in plural numbers. A button knob through-hole 125 is formed between two adjacent barrier ribs 124 so that at least partial constituent elements of the button switch unit 500 can be passed through the button knob through-hole 125. A button holder guide 126 is formed on an inner surface of the button knob through-hole 125 so as to guide a stable vertical movement of the button guide holder 540 which will be described later and prevent an erroneous assembly of the button guide holder 540 and the wheel housing body 120. In addition, a wheel housing body stopper 127 is formed on an inner surface of the button knob through-hole 125 so that the button knob 510 can be prevented from being undesirably separated and escaping from the button knob through-hole 125 by a vertical restoring force thereof through the button switch 550, which will be described later, and the like. Thus, the button guide holder comprises a button guide holder stopper 545 (see FIG. 4) formed on one side thereof, and the haptic wheel housing body 120 of the haptic wheel housing unit comprises the wheel housing body stopper 127 formed thereon in such a fashion as to come into close contact with the button guide holder stopper 545 to correspond to the button guide holder stopper 545 so that the button guide holder 540 is prevented from being separated and escaping from the wheel housing body 120 of the haptic wheel housing unit 100.

The wheel housing base 130 is disposed to confront the wheel housing cover 110 with the wheel housing body 120 interposed between the wheel housing cover 110 and the wheel housing base 130. The wheel housing base 130 includes wheel housing base mounting part 131 formed on an outer circumference thereof so that it is engaged with the wheel housing cover mounting part 111 to ensure a stable engagement between the wheel housing cover 110 and the wheel housing base 130.

A wheel housing base connector 132 is disposed on the wheel housing base 130 and a board connector pin 211 connected to the circuit board unit 200 which will be described later is disposed in the wheel housing base connector 132 to establish an electrical connection with an external electrical device. Herein, although an element denoted by a reference numeral 200 is named a circuit board unit, it may be implemented as a typical printed circuit board or an insert injection structure within a rage of forming a circuit wiring. In addition, the circuit board unit 200 may be may be constructed in various manners within a range of achieving delivery of an electrical signal, such as being formed as a metal board for releasing heat generated from an LED, and the like to the outside.

The circuit board unit 200 is disposed inside the haptic wheel housing unit 100. The circuit board unit 200 may be formed as a single board, but in this embodiment, takes a structure having a plurality of boards. The printed circuit board 200 is electrically connected with another element, particularly the haptic wheel device 300 which will be described later so that delivery of an electrical signal that applies a rotating force to a haptic shaft of the haptic wheel device actuator 310 or senses the rotating state of the haptic shaft can be established.

The circuit board unit 200 includes a main board 210, a sensing board 220, a flexible board 230, and a knob board 240. The main board 210 is disposed between the wheel housing body 120 and the wheel housing base 130, and the connector pin 211 is disposed on the main board 210 to establish an electrical connection with an external electrical device. The main board 211 has a through-hole 213 formed at the center thereof so that another element, i.e., the haptic wheel device actuator 310 can be penetratingly disposed in the main board 211 through the through-hole 213.

An element of a haptic wheel device sensing unit 330 of the haptic wheel device 300, which will be described later, is disposed on the sensing board 220. The sensing board 220 is vertically disposed on the main board 210. This is an example of one embodiment of the present invention and the arrangement structure of the sensing board is not limited thereto, but various modifications including being integrated with the main board can be made to the sensing board. In this embodiment, the sensing board 220 is fixedly mounted on a fixture base 323 of a haptic wheel device fixture 320 of the haptic wheel device 300 to implement a structure of being vertically disposed on the main body 210.

The flexible board 230 is connected at both ends to the main board 210 and the sensing board 220 which are vertically oriented with respect to each other, respectively, to establish a smooth electrical connection between the main board 210 and the sensing board 220. In this embodiment, although the main board 210 and the sensing board 220 are connected with each other through the flexible board 230, a structure may be implemented in which they are directly connected with each other.

The knob board 240 is disposed on a top of the haptic wheel device actuator 310 of the haptic wheel device 300, which will be described later. A haptic knob light source unit 340 is disposed on the knob board 240 so that a light output function through the haptic knob 301 can be performed by the haptic knob light source unit 340.

The haptic wheel device 300 is disposed in the haptic wheel housing unit 100. The haptic wheel device 300 includes a haptic wheel device actuator 310, a haptic wheel device fixture 320 and a haptic wheel device sensing unit 330. The haptic wheel device actuator 310 establishes an electrical connection with the circuit board unit 200 so that it receives an electrical signal from an internal/external control unit to generate a predetermined rotating force, impact force, or rotation restraining force and provide an inner force sense to a manipulator according to a scheme in which the electrical signal through the electrical connection is previously stored in a stored unit, in response to a state in which the manipulator turns or rotates the haptic knob, or in a certain predetermined and stored manner for a warning of a vehicle state. In this embodiment, the haptic wheel device actuator 310 is implemented as an electric motor. The haptic wheel device actuator 310 according to this embodiment is formed as a two-axis electric motor. The term "two-axis" refers to a structure in which a rotating shaft is connected to both ends of the haptic wheel device actuator. The haptic knob 301 and the haptic wheel device sensing unit 330 are connected to haptic shafts 311 and 313 of the haptic wheel device actuator 310 implemented as the two-axis electric motor, respectively. The haptic shafts 311 and 313 are disposed on both ends of the haptic wheel device actuator 310 and include a first end 311 and a second end 313. The first end 311 is connected to the haptic knob 301 and the second end 313 is connected to the haptic wheel device sensing unit 330, which will be described later.

The haptic wheel device actuator 310 is stably disposed in the haptic wheel housing unit 100 by means of the haptic wheel device fixture 320, and performs a stable vertical movement together with a push switch operating part 420 of a push switch unit 400, which will be described later. The haptic wheel device fixture 320 includes a fixture body 321 and a fixture base 323. The fixture body 321 has a through-hole 326 formed at an upper end of thereof and has a through-hole 324 formed at a lower end thereof. The haptic shafts 311 and 313 of the haptic wheel device actuator 310 constructed as the two-axis electric motor are penetratingly disposed in the upper and lower ends of the haptic wheel device actuator 310 through the fixture body through-hole 326 and the fixture base through-hole 324, respectively. A fixture mounting part is respectively disposed on the outer circumference of the fixture body 321 and the fixture base 323 and a fixture fastening member 328 such as a bolt is mounted on the fixture body 321 and the fixture base 323 through the fixture mounting parts so that the fixture body 321 and the fixture base 323 can be securely fastened to each other.

The fixture body 321 has a knob board seating part 327 formed on the upper end thereof so that the knob board 240 of the circuit board unit 200 can be seated on the knob board seating part 327 to achieve a stable fixing state. A fixture base sensing mounting part 325 is formed at one side of the fixture base 323 and achieves a stable mounting state of a rotatable sub-pulley shaft 336 of the haptic wheel device sensing unit 330

The haptic knob 301 is connected with the haptic shaft 311 and is exposedly disposed on one surface of the haptic wheel housing unit 100. The haptic knob 301 is connected with the haptic shaft 311 of the haptic wheel device actuator 310 and a shaft knob holder 312 can be disposed between the haptic knob 301 and the haptic shaft 311. The shaft knob holder 312 is interposed between the haptic knob 301 and the first end 311 of the haptic shafts 311 and 313 so that a undesired relative rotation between the haptic knob 301 and the first end of the haptic shafts 311 and 313 can be prevented through the shaft knob holder 312.

The shaft knob holder 312 and the first end 311 take a press-fit configuration. The outer circumference of the shaft knob holder 312 can have a chamfered polygonal structure in which the relative rotation between contact regions is prevented. In addition, the shaft knob holder 312a is not limited thereto, but may be may be constructed in various manners within a range of having a structure of preventing the relative rotation between the haptic knob and the haptic shaft of the haptic wheel device actuator, such as achieving the engagement state between the first end and the shaft knob holder through a fastening means such as a separate knob screw or the like.

The haptic knob 301 includes a haptic knob plate 301a and a haptic knob body 301b. The haptic knob body 301b has a recess 301c formed at a lower portion thereof so that the shaft knob holder 312 can be accommodated in the recess 301c. The haptic knob plate 301a is disposed on one surface of the haptic knob body 301b. The haptic knob body 301b and the haptic knob plate 301a may be integrally formed with each other. A haptic knob grip 301-2 is formed on one surface of the haptic knob plate 301a so that a user can perform a smooth rotation operation of the haptic knob 301, i.e., a smoothly rotary operation about the haptic shafts 31 and 313 of the haptic wheel device actuator 310 without any slipping.

Figure 5:
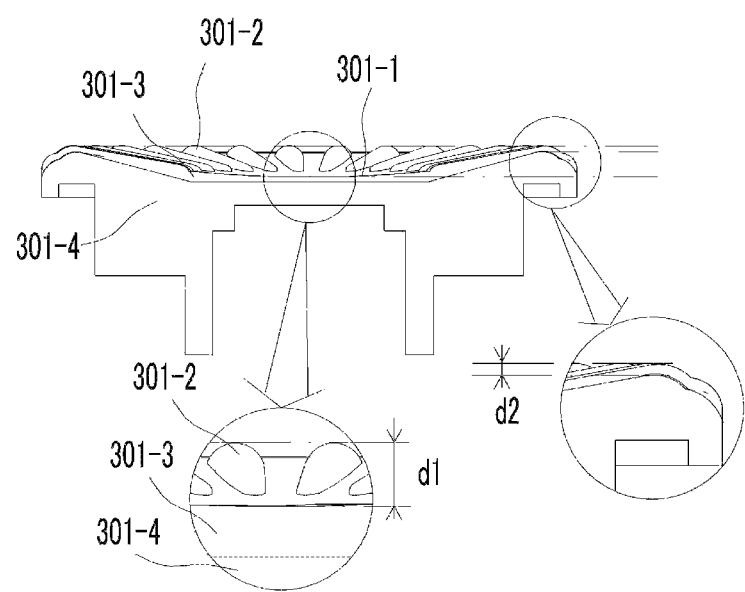
FIG. 5 is a schematic cross-sectional view illustrating a haptic knob of a haptic steering wheel switch apparatus according to one embodiment of the present invention.

In addition, a haptic knob dimple 301-1 is formed on one surface of the haptic knob 301. The haptic knob dimple 301-1 is formed in a concave shape and takes a structure in which it is gradually increased in depth in the direction of the rotating shaft of the haptic knob 301 as it goes toward the central region thereof. That is, the haptic knob dimple 301-1 has a structure in which a dimple depth d1 and d2 formed in a direction perpendicular to the rotation center of the haptic knob 301 is gradually decreased as it goes toward a radial direction from the center of the haptic knob 301. That is, as shown in FIG. 5, the depth d1 of the haptic knob dimple 301-1 at the central region of the haptic knob 301 is set to be much larger than the depth d2 of the haptic knob dimple 301-1 at the peripheral region of the haptic knob 301 so that a driver can perform a smoother rotation operation of the haptic knob 301 using his or her finger, particularly his or her thumb.

By virtue of this structure, the driver can achieve an easy contact state between the finger and the haptic knob 301 to perform a smooth rotation operation of the haptic knob 301 when performing the rotation operation of the haptic knob 301 using his or her finger such as a thumb while manipulating the steering wheel 2. In other words, in the case where the haptic knob 301 has a structure in which the haptic knob dimple is not formed or is formed convexly in a hemispherical shape, it is difficult for a driver to perform a smooth rotation operation of the haptic knob 301 with him or her pressing the top surface of the haptic knob. On the contrary, in case of the haptic knob 301 formed with the haptic knob dimple as constructed above, the driver can perform a smoother rotation operation of the haptic knob 301 with him or her pressing the top surface of the haptic knob, particularly with him or her gripping the wheel rim of the steering wheel.

Besides, the haptic knob 301 may include an element for allowing a driver to perform a smooth rotation operation. That is, the haptic knob grip 301-2 is protrudingly formed on one surface of the haptic knob 301. By virtue of the construction of the haptic knob grip 301-2, when the driver performs a rotation operation of the haptic knob using his or her finger such as a thumb, he or she can maintain a smooth rotation state without any slipping.

The haptic knob 301 may be formed as a single body, but may have a dual injection structure for allowing the driver to perform a smoother manipulation of the haptic switch device through the haptic knob 30, if necessary. That is, the haptic knob 301 may have a structure in which formed on surface of the haptic knob 301 is the haptic knob contact surface 301-3, which is made of a material having a low possibility of slipping at the time of contacting the skin of the driver's finger or the like, so as to increase a contact frictional force between the driver's finger and the haptic knob. For example, the haptic knob 301 may have a structure in which a portion denoted by a reference numeral 301-4 is primarily formed of a material such as polycarbonate (PC), and the haptic knob contact surface 301-3 formed by dual-injecting thermoplastic elastomer such as polyurethane or the like is additionally formed on one surface of the portion 301-4. In this case, when the driver manipulates the haptic knob, slipping due to sweat appearing on his or her finger can be prevented to perform a smooth rotation operation.

The haptic wheel device sensing unit 330 is connected with the second end 313 of the haptic shafts 311 and 313 to detect the rotation state of the haptic shaft, i.e., the operation state of the haptic wheel device actuator 310. The second end of the haptic wheel device actuator is connected with the haptic wheel device sensing unit 330. In order to prevent the relative rotation between the haptic wheel device actuator 310 and the haptic wheel device sensing unit 330, a shaft sensing holder 314 is disposed between the second end of the haptic shaft of the haptic wheel device actuator 310 and the haptic wheel device sensing unit 330. The shaft sensing holder 314 is an element corresponding to the shaft knob holder 312 used for connection between the first end and the haptic knob. The shape and structure of the shaft sensing holder 314 is the same as that of the shaft knob holder 312, and thus the detailed description thereof will be replaced with the aforementioned description of the shaft knob holder 312.

Figure 4:
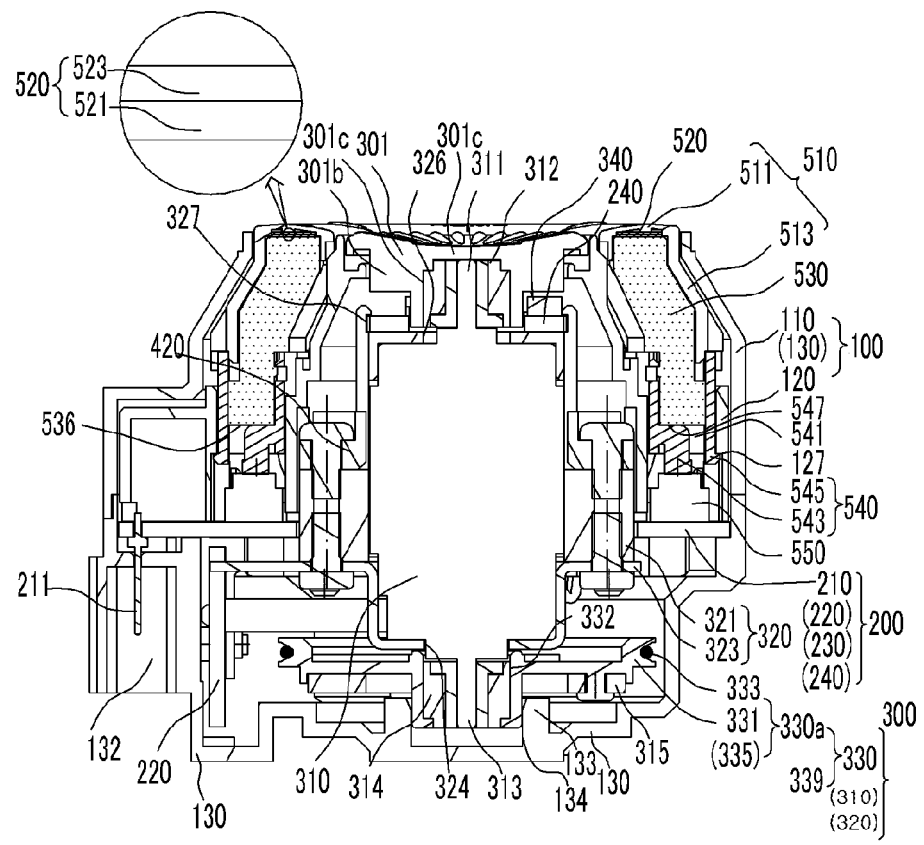
FIG. 4 is a schematic cross-sectional view illustrating a haptic steering wheel switch apparatus according to one embodiment of the present invention.
Figure 9:
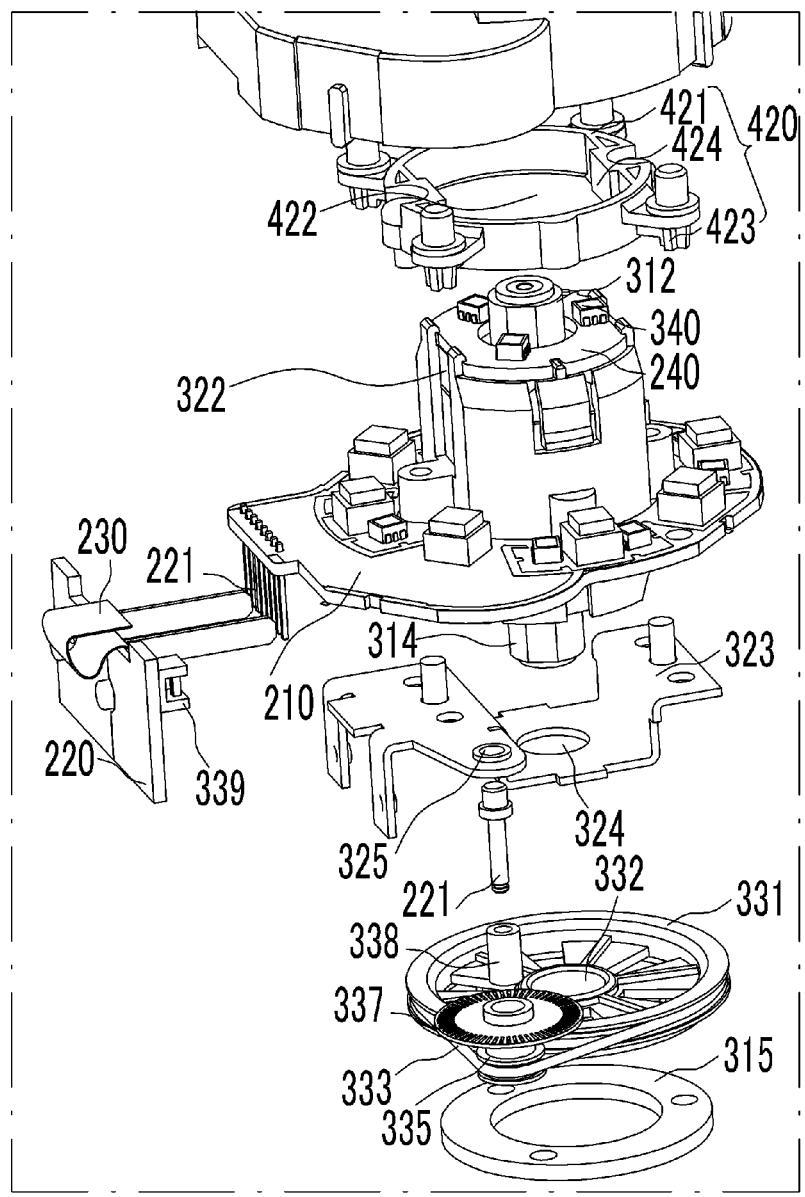
FIG. 9 is a schematic partial enlarged exploded perspective view illustrating a haptic steering wheel switch apparatus according to one embodiment of the present invention.
Figure 10:
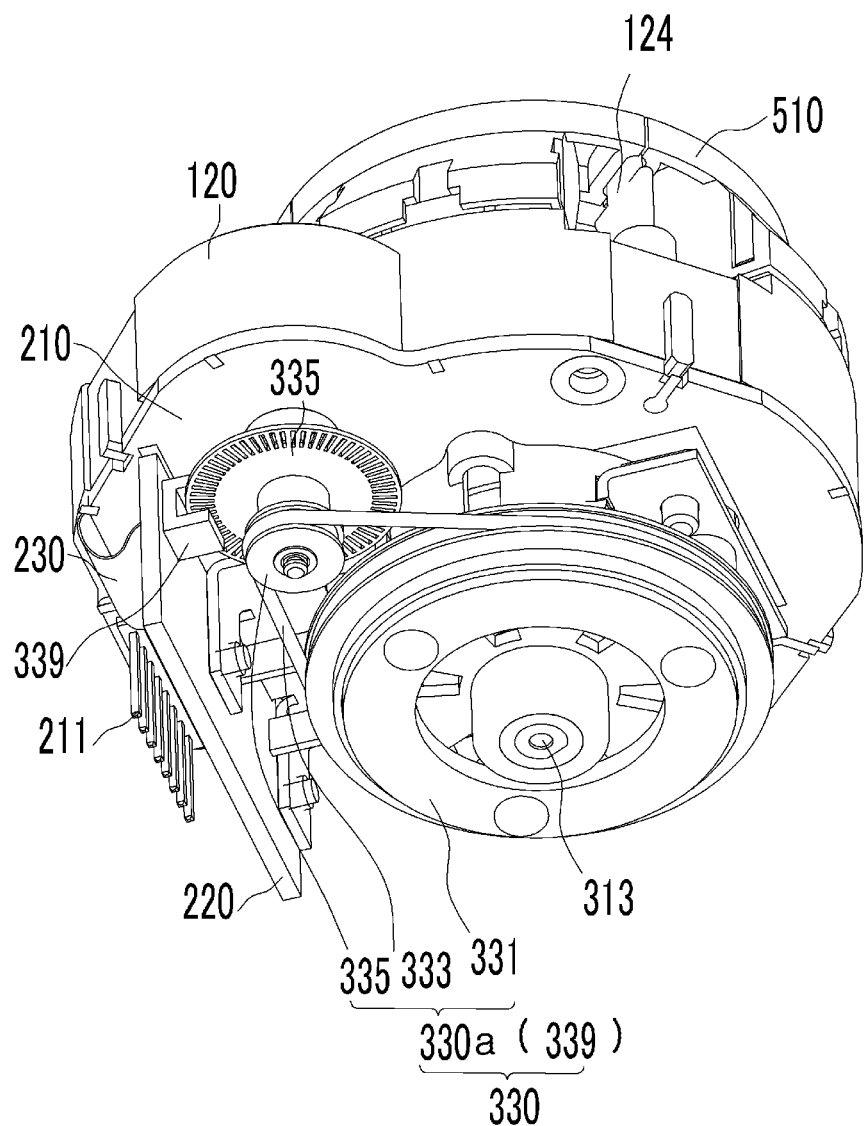
FIG. 10 is a partial enlarged bottom perspective view illustrating a haptic steering wheel switch apparatus according to one embodiment of the present invention.
Figure 11:
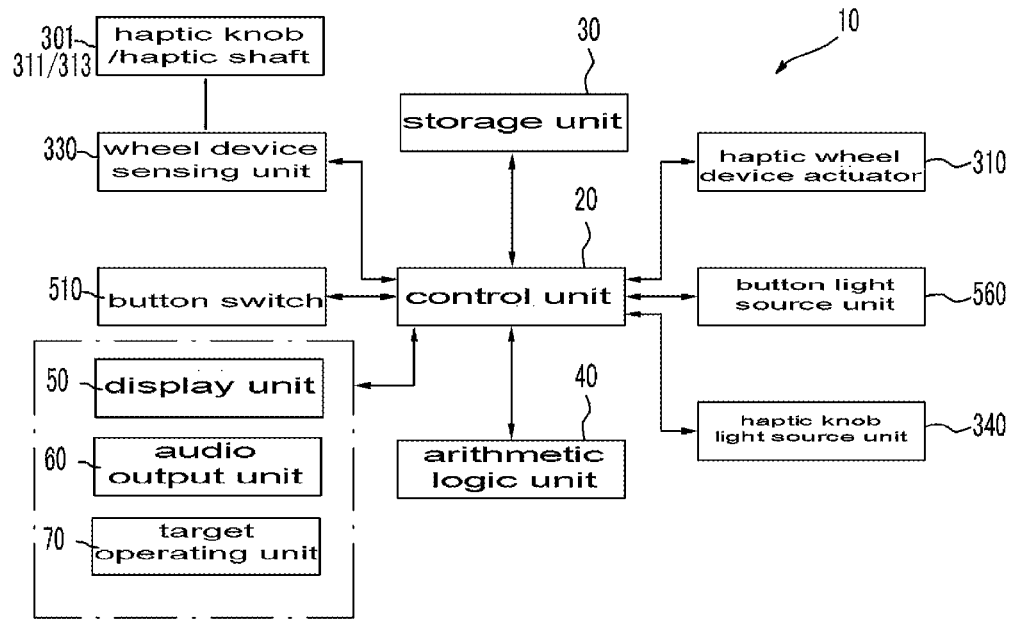
FIG. 11 is a schematic block diagram illustrating a haptic steering wheel switch system including a haptic steering wheel switch apparatus according to one embodiment of the present invention.
Figure 12:
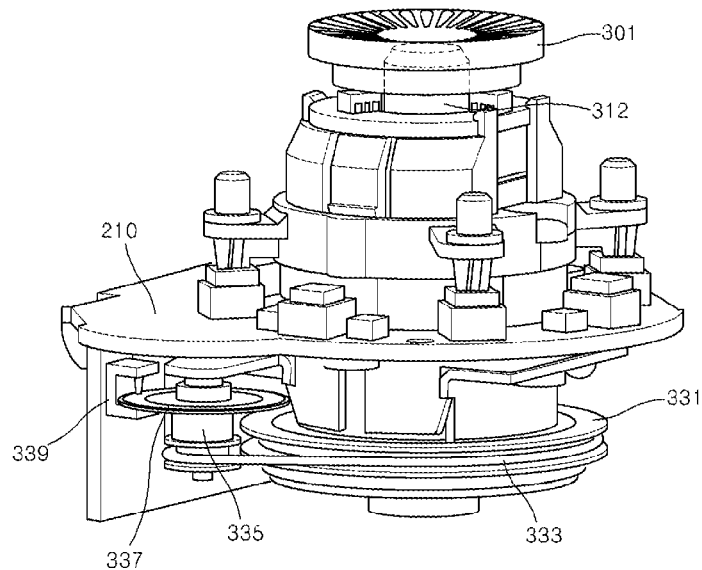
FIG. 12 is a schematic perspective view illustrating a rotary operation of a haptic knob of a haptic steering wheel switch apparatus according to one embodiment of the present invention.
Figure 13:
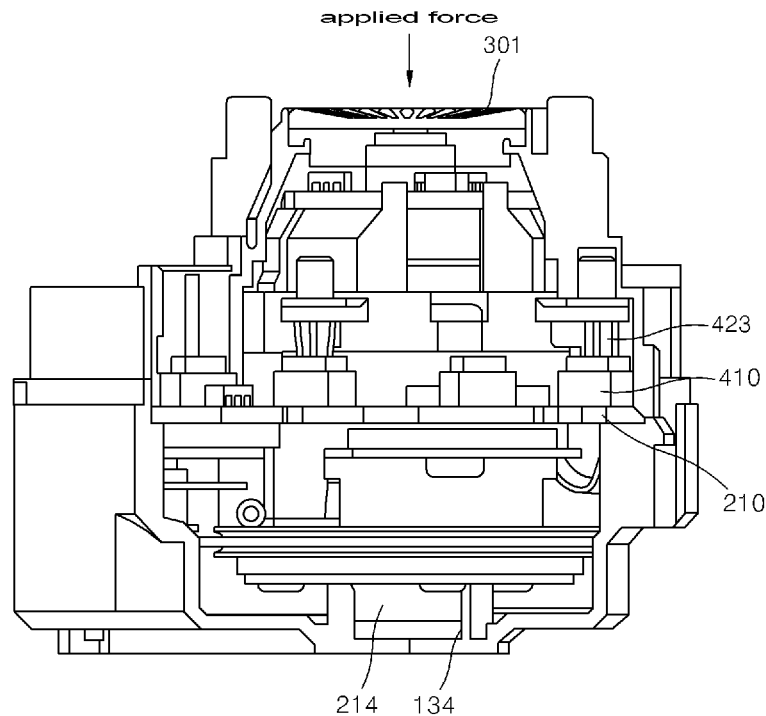
FIG. 13 is a schematic view illustrating an operation of a button switch unit of a haptic steering wheel switch apparatus according to one embodiment of the present invention.

The haptic wheel device sensing unit 330 in FIG. 4 is implemented as a light detector in this embodiment. As shown in FIG. 4, the haptic wheel device sensing unit 330 includes a device sensing body part 330a (see also FIG. 10) and the device detecting sensor part 339 (see also FIG. 10 and FIG. 9). The device sensing body part 330a is connected with the haptic wheel device actuator 310 to output the rotation state of the haptic shaft, and the device detecting sensor part 319 detects the rotation state of the device sensing body part 330a. In this embodiment, although the device sensing body part is constructed as a structure for mechanically transferring the rotation state of the haptic shaft, and the device detecting sensor part is implemented as a photosensor for detecting the rotation of the device sensing body part, a construction may be implemented in which the device sensing body part includes a magnet and the device detecting sensor part includes a magnetic sensor. The device sensing body part 330a of this embodiment includes a device sensing main pulley 331, a device sensing sub-pulley 335, a device sensing belt 333, and device slot 337 (see FIG. 9). The device sensing main pulley 331 is connected with the shaft sensing holder 314 (see FIG. 9) in such a fashion that the relative rotation between the device sensing main pulley 331 and the shaft sensing holder 314 is restricted, so that it is rotated together with the second end 313 of the haptic shaft. The device sensing main pulley 331 has a main pulley mounting hole 332 (see FIG. 9) formed at the center thereof so that the shaft sensing holder 314 is inserted into and accommodated in the main pulley mounting hole 332. Disposed at a lower end of the device sensing main pulley 331 is a shaft inertial body 315 (see FIG. 9) serving as a constituent element for achieving a stable operation of the haptic shaft through the device sensing main pulley 331 and producing an accurate inner force sense. The shaft inertial body 315 is constructed of a donut type so that it is fittingly disposed around the outer circumference of the main pulley mounting hole 332 of the device sensing main pulley 331. The shaft inertial body 315 and the device sensing main pulley 331 may be integrally formed with each other, if necessary, but the shaft inertial body according to this embodiment is formed as a separate element so that it is securely mounted to the lower end of the device sensing main pulley 315 through a fastening member such as a bolt.

The device sensing sub-pulley 335 is connected with the device sensing main pulley 331 so as to be spaced apart from the device sensing main pulley 311, and the device sensing belt 333 interconnects the device sensing main pulley 331 and the device sensing sub-pulley 335 to transfer the mechanical rotation state of the device sensing main pulley 331 to the device sensing sub-pulley 335. The device slot 337 has a structure of being coaxially connected to the device sensing sub-pulley 335, and is rotated together with the device sensing sub-pulley 335 when the device sensing sub-pulley 335 is rotated. The device slot 337 is rotatably supported by the sub-pulley shaft 336. The sub-pulley shaft 336 is rotatably mounted to the fixture base 323 of the haptic wheel device fixture 320. In this case, the sub-pulley shaft 336 is insertedly disposed in the fixture base sensing mounting part 325 of the fixture base 323. The device sensing sub-pulley 335 and the device slot 337 are mounted to the sub-pulley shaft 336. A sub-pulley bushing 338 may be further provided between the sub-pulley shaft 336 and the device sensing sub-pulley 335 in order to achieve a smooth rotation between the fixture base 323 and the device sensing sub-pulley 335. The device detecting sensor part 339 is disposed on the sensing board 220 so as to be adjacent to the device slot 337. The device detecting sensor part 339 is implemented as a photosensor. The device slot 337 is disposed between a light emitting section and a light receiving section of the device detecting sensor part 339 so that the rotation state of the second end of the haptic shaft is converted into an optical signal by the device detecting sensor part via the device sensing main pulley, the device sensing belt, the device sensing sub-pulley, and the device slot to allow the device detecting sensor part to output a change in an electrical signal. Such a change in electrical signal can be transmitted to an internal or external electrical device such as a control unit through the connector pin disposed in the wheel housing base connector 132.

In this embodiment, a rotation ratio of the device sensing main pulley 331 to the device sensing sub-pulley 335 preferably has a value of more than 1. While the haptic knob 301 manipulated through a driver's finger is rotated once, i.e., the device sensing main pulley 331 connected to the haptic knob 301 and performing a coaxial rotation is rotated once, the device sensing sub-pulley 335 is rotated several times, so that a resoving power through the device detecting sensor part 339 for once rotation of the haptic knob 301 can be ultimately increased to achieve more accurate detection of the haptic knob 301 and the haptic shaft.

In the above embodiment, although it has been described that the haptic wheel device sensing unit adopts a pulley/belt structure, it may be constructed in various manners within a range of sensing the accurate rotation state of the haptic knob or the haptic shaft, such as adopting a gear transmission structure. In the case where the haptic wheel device sensing unit adopts the gear transmission structure, a gear of the haptic shaft side and a gear in which the device slot of the haptic wheel device sensing unit is disposed may be directly connected with each other, and more than one idle gear may be connectedly disposed between these gears, if necessary. In addition, in the above embodiment, although the haptic wheel device sensing unit is implemented as a photosensor structure, it may be constructed in various manners within a range of sensing the rotation state of the haptic knob.

By virtue of the constructions of the haptic knob, the haptic wheel device actuator, and the haptic wheel device sensing unit, a manipulation state involving the intention of a manipulator is detected by the haptic wheel device sensing unit via the haptic knob, and a predetermined inner force sense signal generated from the haptic wheel device actuator implemented as a two-axis motor is applied to the manipulator through the haptic knob in a predetermined manner transferred from the internal or external electrical device to implement the operation such as a warning or the like in response to the manipulation state detected by the haptic wheel device sensing unit or in a predetermined manner, so that the manipulator can achieve a more stable and accurate tactile perception. The haptic knob 301 achieves a rotary operation on a substantial plane on which the vehicle steering wheel 2 is arranged in such a fashion that the haptic knob 301 performs the rotary motion about the haptic shaft acting as a central axis. By virtue of the rotary operation, a user can maintain the steering state through the wheel rim 2A of the vehicle steering wheel 2 and simultaneously can implement a thumb-wheel type operation enabling the manipulation of the haptic steering wheel switch apparatus 10 through his or her thumb. This can enhance a manipulation function such as smooth selection of preset menus through the haptic knob even without diverting a driver's driving attention in a state of gripping the wheel rim by eliminating the operation of having to separate a driver's hand from the steering wheel, more specifically, the wheel rim to manipulate the switch. For example, in implementation of a device for displaying a predetermined select menu on a screen by associating a conventional structure performing a seesaw operation or a scroll operation about a hinge point with a display device, problems are involved in that since it is difficult for a driver to control a select manipulation at the time of making a predetermined menu selection, the driver is apt to pass by a menu which he or she wants to select. On the other hand, in case of the haptic steering wheel switch apparatus of a thumb-wheel driving type, an advantage is involved in that the driver can rapidly and accurately select a menu which he or she wants through the rotary operation by the driver's thumb in a clockwise or counter-clockwise direction, thereby achieving a smoother provision of an inner formce sense. In addition, a user interface associated with the rotary operation of the haptic steering wheel switch apparatus can also be produced in various manners.

In the meantime, the haptic steering wheel switch apparatus according to the present invention enables a push operation through the haptic knob, i.e., a vertical movement in a longitudinal direction perpendicular to the plane on which the vehicle steering wheel is arranged. By virtue of such a structure, the inventive haptic steering wheel switch apparatus can implement various operations through a smooth tactile rotary operation and push operation based on a thumb-wheel driving method. The haptic steering wheel switch apparatus may further include a push switch unit 400 for outputting a change in a switching signal through the vertical movement of the haptic steering wheel switch apparatus. The push switch unit 400 includes a push switch 410 and a push switch operating part 420. The push switch 410 is disposed on one surface of the main board 210 of the circuit board unit 200. Although the push switch 410 is implemented as a tact switch which is vertically operated in this embodiment, it may be constructed in various manners within a range of performing a push operation, such as being implemented as a metal dome switch. The push switch operating part 420 is moved vertically together with the haptic wheel device actuator 310 to turn on or off the push switch 410. The push switch operating part 420 includes a push switch operating body 421 and a push switch operating protrusion 423. The push switch operating body 421 has a ring type structure. The push switch operating body 421 has a through-hole 422 formed at the center thereof so that the haptic wheel device fixture 320 disposed on the outer circumference of the haptic wheel device actuator 310 is penetratingly disposed in the through-hole 4221. A push switch mounting part 424 is formed on the inner circumferential surface of the through-hole 422 of the push switch operating body 421 and a fixture body push switch mounting part 322 is formed on the outer circumferential surface of the haptic wheel device fixture 320 to correspond to the push switch mounting part 424. Thus, the push switch mounting part 424 is engaged with the fixture body push switch mounting part 322 so that the push switch operating body 421 and the haptic wheel device fixture 320 can be stably assembled with each other and can be maintained in a mounted state. In addition, the push switch operating part 420 may have a structure in which a fastening element is provided on the outer circumferential surface of the push switch operating body 421 so that the push switch operating body and the haptic wheel device fixture can be fastened to each other upon the engagement between the fixture body and the fixture base.

The push switch operating protrusion 423 is disposed on the outer circumference of the push switch operating body 421, so that it can establish a direct contact with the push switch 410, can constantly maintain the support state of a structure in which the push switch operating protrusion 423, the push switch operating body 421, the haptic wheel device fixture 320, the haptic wheel device actuator 310, and the haptic knob 301 are connected sequentially through an initial support state of the push switch 410, and can establish a predetermined vertical movement state when an external force larger than a force applied to the push switch 410 is applied to the haptic knob 301

In one embodiment of the present invention, the push switch 410 is provided in plural numbers. The push switch operating protrusion 423 is also provided in plural numbers to correspond to a plurality of push switches 410. In this embodiment, by virtue of the push switches 410 and the push switch operating protrusion 423, the number of each of which is four, the haptic wheel device actuator 310 and the haptic knob 301 can establish a stable support state through the push switches 410.

At the normal times when an external force is not exerted to the haptic knob, the haptic wheel device actuator 310 establishes a stable vertical support state through the push switches 410. On the other hand, when a user such as a driver vertically presses the haptic knob 301 with a force of more than a preset value, there occurs a change in an electrical signal of the push switch 410 via the haptic knob 301, the haptic wheel device actuator 310, the haptic wheel device fixture 320, and the push switch operating part 420. In this embodiment, the number of the push switch 410 provided is four, and an individual switching operation may be implemented depending on the pressing direction of the haptic knob 301. For example, a tilting operation may be implemented in which when the user presses the top right end of the haptic knob 301, only a certain region is pressurized so that the haptic wheel device actuator 310 is moved downwardly at one side end thereof only. On the other hand, when the user vertically presses the haptic knob 301 connected with the haptic wheel device actuator 310 while maintaining the central region of the haptic knob 301 in a horizontal state, the entire vertical pressing operation is achieved so that signals may be generated from four push switches. A structure may be implemented in which when the push switches disposed diagonally relative to the center of the haptic knob 301, i.e., the central axis of the haptic wheel device actuator 310 are pressed concurrently or continuously within a certain time, this is recognized to be an entire vertical pressing operation, but not an each individual tilting operation.

Meanwhile, the push switch unit 400 may have a structure in which the push switches 410 are securely disposed on the main board 210 and only the push switch operating part 420 is vertically moved together with the haptic wheel device actuator 310 whereas the haptic wheel device sensing unit 330 is vertically moved together with haptic wheel device actuator. The sensing board 220 is securely disposed on the fixture base 323 of haptic wheel device fixture 320 on which the haptic wheel device actuator 310 is disposed, and the device sensing main pulley of the device sensing body part is connected to the haptic shaft and the device sensing sub-pulley is connected to the fixture base, so that the device detecting sensor part and the device sensing body part establish a structure in which they are ultimately vertically moved together with the haptic wheel device. By virtue of this structure, the connection between the push switch unit implementing the push operation and the haptic wheel device implementing the rotary operation is ultimately made through the haptic knob, so that an excellent manipulation feeling can be imparted to a manipulator such as a driver through the integration of the vertical push operation and the rotary operation and diversified operations can be implemented, such as achieving a stable tilting function simultaneously.

Figure 14:
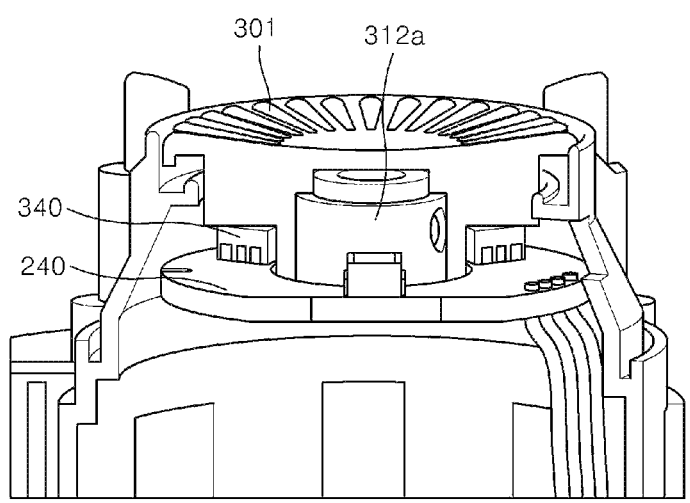
FIG. 14 is a schematic perspective view illustrating a modified example of a shaft knob holder of a haptic steering wheel switch apparatus according to one embodiment of the present invention.
Figure 15:
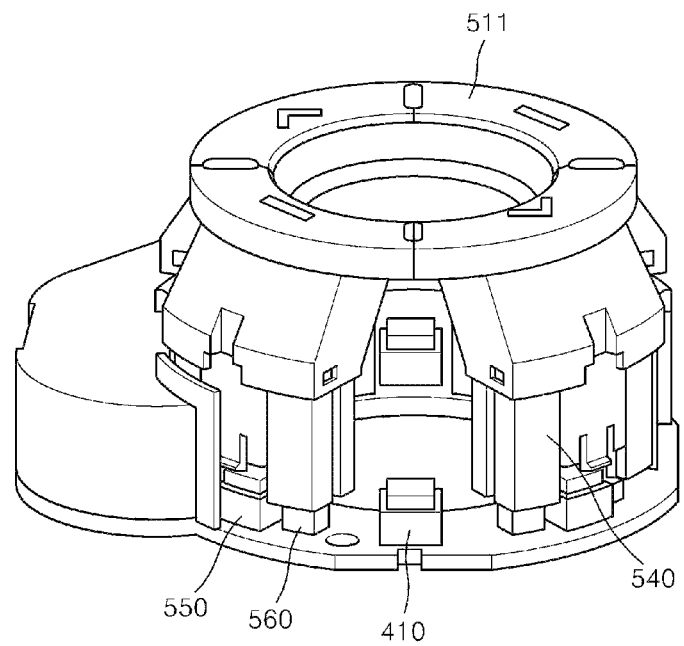
FIG. 15 is a schematic partial enlarged perspective view illustrating a button switch unit of a haptic steering wheel switch apparatus according to one embodiment of the present invention.
Figure 16:
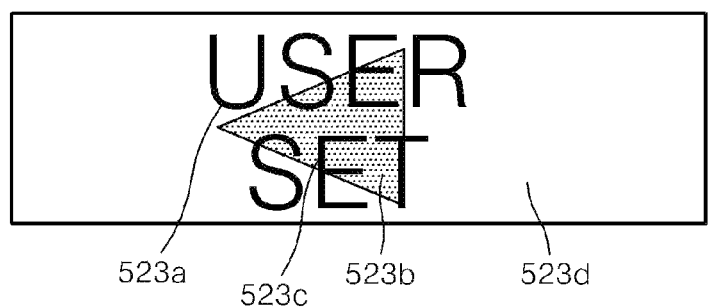
FIG. 16 is a schematic top plan view illustrating a button color filter body of a button color filter of a haptic steering wheel switch apparatus according to one embodiment of the present invention.

The haptic steering wheel switch apparatus may further include a construction which can improve the visual perception through the output of light at the time of implementing the rotary operation and the push/tilting operation and performing each function. The haptic wheel device 300 of the present invention may include a haptic knob light source unit 340. The haptic knob light source unit 340 (see FIG. 14) is disposed on the knob board 240 of the circuit board unit 200. The knob board 240 is disposed on the top end of the haptic wheel device actuator 310 in such a fashion that the first end 311 of the haptic shaft 311 is penetratingly disposed at an end of the haptic wheel device actuator 310. More specifically, the knob board seating part 327 is formed on the upper end of the fixture body 321 so that the knob board 240 is seated in the knob board seating part 327 (see FIG. 4). In this case, the knob board 240 can establish an electrical connection with the main board 210 through a separate line. The haptic knob light source unit 340 is disposed on one surface of the knob board 240 and is implemented as an LED. The haptic knob 301 is formed of a light-transmitting material such as polycarbonate (PC) so that light exiting the haptic knob light source unit 340 on the knob board 240 can be smoothly transferred to the outside. The haptic knob light source unit 340 can be provided in plural numbers. The haptic knob light source unit 340 according to the present invention is constructed such that the LEDs that emit light of blue, green, and red colors are arranged equiangularly on the knob board 240 or a unified module is arranged in plural numbers to output a multicolor. Light emitted from the haptic knob light source unit 340 implemented as LEDs is transmitted and/or guided through a bottom surface of the haptic knob body 301*b* and is outputted to the outside. The haptic knob light source unit 340 is operated such that light of various colors, sizes and cycles is outputted to the outside in a predetermined controlled manner, such as flickering light in a predetermined manner, for example, cyclically over a predetermined period of time, outputting the light in a signal cycle changed constantly, or outputting given colors simultaneously to output a combined color, so that a user such as a driver can visually rapidly perceive the operation state of the haptic steering wheel switch apparatus or the manipulation state selected by the user.

In the meantime, the haptic steering wheel switch apparatus 10 according to the present invention includes a button switch unit 500 so that the button switch unit and the haptic wheel device can perform a combined manipulation function. The button switch unit 500 is disposed at an outside of the haptic knob 301. In this case, the button switch unit 500 can achieve a separate vertical operation independently of the haptic wheel device actuator or the push switch unit through the haptic knob 301 to generate a certain changed switching signal.

The button switch unit 500 according to the embodiment of the present invention is constructed in such a fashion as to surround an outer periphery of the haptic knob 301. The button switch unit 500 includes a button knob 510, a button guide 530, a button guide holder 540, and a button switch 550. The button knob 510 is disposed on the outside of the haptic knob 301 in such a fashion as to be exposed at one surface thereof to the outside of the haptic wheel housing unit 100. The button knob 510 includes a head 511 and a body 513. The button knob head 511 is exposedly disposed on the outside of the haptic knob 301, and the button knob body 513 is disposed at a lower end of the button knob head 511. Although the button knob head 511 and the button knob body 513 are integrally formed with each other in this embodiment, they may be formed separately from each other.

A button knob icon 512 can be indicated on one surface of the button knob head 511, and may be directly formed on one surface of the button knob head 511. The button knob head 512 may have a structure in which it is formed of a transparent material such as polycarbonate, if necessary, so that the button knob icon is outputted through a separate display device.

The button knob head 511 and the button knob body 513 are constructed to define an inner space therebetween so that the button guide 530 can be disposed in the inner space. The button guide 530 is disposed at one end thereof within the button knob 510 and is disposed at the other end thereof within the haptic wheel housing unit 100 toward the circuit board unit 200. That is, the button guide 530 is disposed in an inner space defined between the button knob head 511 and the button knob body 513 in such a fashion as to be oriented at the other end thereof toward the main board 210. The button guide 530 includes a head 531 and a body 533. Although the button guide head 531 and the button guide body 533 are integrally formed with each other in this embodiment, they may be formed separately from each other. The button guide body 533 is connected to one end of the button guide head 531, and a top end of the button guide head 531 is insertedly disposed in the inner space defined between the button knob head 511 and the button knob body 513. A bottom end of the button guide body 533 is disposed within the button guide holder 540 in such a fashion as to be oriented toward the main board 210. The button guide 530 is formed of a transparent or colored light guide material so that light entering the button guide 530 through an end of the button guide body 533 is transferred to the outside through one surface of the button guide body 533. A male mounting part 535 is formed on a side of the button guide body 533 and a female mounting part 544 is formed on a side of the button guide holder 540 to correspond to the male mounting part 535, so that the male mounting part 535 and the female mounting part 544 are fittingly engaged with each other. The button guide body 533 includes a groove 534 formed on the outer circumferential surface thereof so that the groove 534 is engaged with a holder receiving groove 542 formed on the button guide holder 540 to establish a smooth relative mounting structure between the button guide 530 and the button guide holder 540 so that a possibility of an erroneous assembly upon the smooth mounting and assembly of the haptic wheel housing unit 100 can be avoided.

The button guide holder 540 is attached to the button guide 530, and is disposed in the haptic wheel housing unit 100, more specifically, the wheel housing body 120 in a vertically stable movable manner together with the button guide 530. The button guide holder 540 is inserted into a button knob through-hole 125 formed on one surface of the wheel housing body 120 in a vertically movable manner. The button guide holder 540 has a button guide holder line 546 formed on the outer surface thereof along the longitudinal direction thereof. A button holder guide 126 is formed on the inner surface of the button knob through-hole 125 to correspond to the button guide holder line 546 so that the button guide holder line 546 and the button holder guide 126 can be engaged with each other in a vertical movable manner.

The button guide holder 540 includes a button guide holder operating part 543 extending downwardly from a lower end of the inside surface of a button guide holder accommodating part 541 formed at the center of the button guide holder 540 so that the button guide holder operating part 543 can maintain a constant contact state with a button switch 550 disposed below the button guide holder. That is, the button guide holder 540, the button guide 530, and the button knob 510 may have a structure in which they are supported by a separate support means, but have a structure in which they are sequentially supported by the button switch 550 in this embodiment.

By virtue of such a structure, a pressure applied to the button knob 510 by a user such as a driver is transferred to the button switch 550 through the button guide holder 540. In this case, the button guide holder operating part 543 has a structure in which it extends downwardly from the inner surface of a button guide holder accommodating part 541 so as to be oriented toward the bottom. The button guide holder operating part 543 has a seating face 547 formed on a top surface thereof to establish a seated state of a button guide body retaining part 536. That is, the button guide 530 has two button branches 537 formed at a lower end thereof and the button guide body retaining part 536 formed at the center thereof so that the button guide body retaining part 536 is brought into close contact with the button guide holder operating part seating face 547 to achieve a stable mounting structure. The button guide branches 537 are branched from the lower end of the button guide body 530 to achieve a structure in which light emitted from a pair of button light source units 560 disposed at both sides of a button switch 550 can be transferred to the top. The button light source units 560 are implemented as LEDs, or the like. The button light source unit 560 can be disposed in plural numbers relative to each button guide to achieve a structure in which it is individually allocated to the pair of button guide branches. The button guide 530 may be formed of a transparent light guide material such as polycarbonate or may have a structure having a predetermined color.

In addition, the button switch unit 500 may further include a display device that can form various icons using light exiting the button light source unit. At the same time, the button light source unit has a structure of outputting light having a plurality of colors relative to each button guide or each button optical filter unit. The button switch unit 500 may further include a button optical filter unit 520. The button optical filter unit 520 includes a button optical filter unit base 521 and a button optical filter unit body 523. The button optical filter unit base 521 is formed as a light guide material to serve to uniformly disperse light entering through a bottom surface of the button optical filter unit base 521. The button optical filter unit body 523 includes a first transmitting region 523a that allows first color light to exit the button light source unit outputting light having a plurality of colors, a second transmitting region 523b that allows second color light different from the first color light to exit the button light source unit, an intersecting region 523c where the first transmitting region and the second transmitting region intersect each other, and a blocking region 523d that blocks the first color light and the second color light. The intersecting region 523c can form a first button icon 512a and a second button icon 512b together with the first transmitting region 523a and the second transmitting region 523c. For example, the button light source unit can include a red LED and a blue LED. The first transmitting region allows red color to exit and the second transmitting region allows blue light to exit so that a predetermined icon such as "USER SET" or "◁" can be displayed through the first transmitting region, the second transmitting region, the intersecting region, and the like.

In addition, the haptic steering wheel switch apparatus according to the present invention may be implemented to be integrated with other constituent elements. That is, the haptic steering wheel switch apparatus 10 is connected to the haptic wheel device actuator 310 which provides an inner force sense in achieving a rotary operation through the haptic knob 301, the haptic wheel device sensing unit 330 which senses a rotary motion state of the haptic wheel device actuator 310, the push switch unit 400 which achieves a push operation through vertical movement of the haptic knob 301 and the haptic wheel device actuator 310, and the button switch unit 500 disposed outside of the haptic knob 301. The haptic steering wheel switch apparatus 10 transfers and receives electrical signals to and from the constituent elements.

In addition, the haptic steering wheel switch apparatus 10 may be configured to have a control unit 20 and a storage unit 30 connected to the control unit 20 or may be implemented to further include an arithmetic logic unit 40. The control unit establishes an electrical connection with the circuit board unit 200 and is connected to the haptic wheel device unit and either the button switch unit or the push switch unit, and the storage unit 30 establishes an electrical connection with the control unit 20 and stores predetermined data for a predetermined operating mode. That is, the storage unit includes data or the like for generating electrical signals according to an operating mode so as to provide an inner force sense when the driver handles the thumb-wheel of the haptic knob. The arithmetic logic unit 40 is electrically connected to the control unit 20 and the storage unit 30 and executes an arithmetic and logic process needed for a predetermined operating mode according to an arithmetic control signal of the control unit 20. The control unit 20, the storage unit 30 and the arithmetic logic unit 40 may be configured in a variety of forms depending on the design specifications, such as being embedded in the haptic steering wheel switch apparatus 10 or being constructed in a structure disposed outside the haptic steering wheel switch apparatus 10 as a separate element.

Signals inputted from the switch units of the haptic steering wheel switch apparatus 10 are transferred to the control unit 20 of the haptic steering wheel switch apparatus 10. The control unit 20 produces a predetermined control signal through a given arithmetic and logic process performed by the arithmetic logic unit 40 and applies it to an output unit based on a predetermined data for the predetermined operating modes for an operating unit which it is desired to select, manipulate, and operate through the haptic steering wheel switch apparatus, for example, the operating modes such as an operating temperature control mode of an air conditioning apparatus, a navigation mode for navigation operation such as destination selection or path search, and the like, as well as a signal inputted from the switch units of the haptic steering wheel switch apparatus 10. The predetermined data is stored in the storage unit 30 that establishes an electrical connection with the control unit 20. The haptic wheel device actuator 310 included in the haptic steering wheel switch apparatus 10 may be included as an output unit. In addition, a separate display unit 50 for displaying an image and/or an audio output unit 60 for outputting sound may be included as an output unit. Further, a control signal received from the control unit 20 may be directly applied to a target operating unit 70 as an object to be controlled directly, for example, an operating unit such as the air conditioning apparatus and the navigator of the vehicle.

Figure 22:
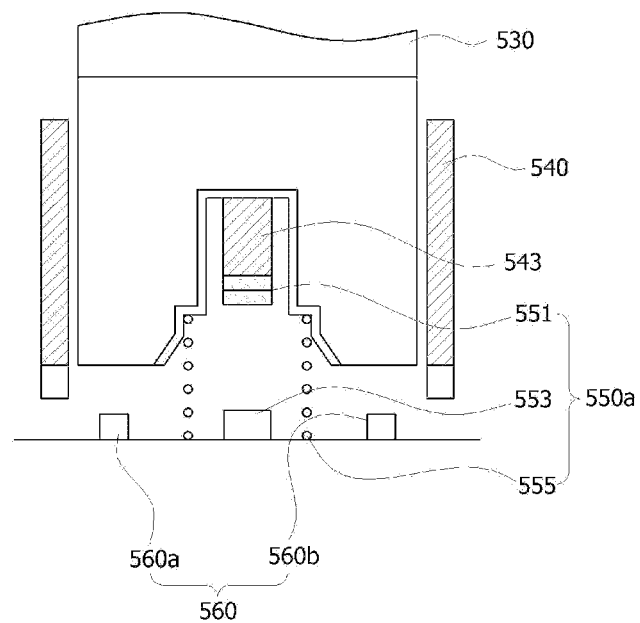
FIG. 22 is a schematic cross-sectional view illustrating another example of a button switch unit of a haptic steering wheel switch apparatus according to one embodiment of the present invention.

Meanwhile, the button switch unit according to one embodiment of the present invention may have a structure of being disposed outside the haptic knob which implements a thumb-wheel operation and independently operating in the vertical direction. Although the button switch unit is implemented as a physically operating tact switch in this embodiment, the button switch unit according to the present invention may have a structure implementing a non-contact type contact point structure. In the embodiment, like reference numerals and names refer to like parts. As shown in FIG. 22, the button switch unit 500 according to the present invention includes a button knob 510, a button guide 530, a button guide holder 540 and a button switch 550a. The button knob 510 is disposed outside the haptic knob 301 so that one surface thereof is exposed to the outside of the haptic wheel housing unit 100, and the button guide 530 is disposed such that one end thereof is disposed inside the button knob 510 and the other end is disposed inside the haptic wheel housing unit 100 toward the circuit board unit 200. The button guide 530 is preferably formed of a transparent light guide material. The button guide holder 540 is attached to the button guide 530 and stably disposed in the haptic wheel housing unit 100, more specifically, in the wheel housing body 120, to be vertically moved together with the button guide 530. The button guide holder 540 is inserted into a button knob through-hole 125 formed on one surface of the wheel housing body 120 in a vertically movable manner as described above. A button guide holder operating part 543 is disposed in the button guide holder 540, and the button guide holder operating part 543 is formed to be extended from a lower end of the inner surface of a button guide holder accommodating part 541 formed at the center of the button guide holder 540 and is disposed to face and to be spaced apart from a button switch magnetic sensor 553 implemented as a magnetic sensor such as a hall sensor disposed at a lower portion.

The button switch 550a includes the button switch magnetic sensor 553, a button switch magnet 551 and a button switch elastic unit 555. As described above, the button switch magnetic sensor 553 is disposed to face the button guide holder 540 on one surface of the circuit board unit 200. The button switch magnet 551 is disposed in the button guide holder 540, and a space for accommodating the button switch magnet 551 is formed at one end of the button guide holder 540. In addition, the button switch elastic unit 555 is implemented in a coil spring, and one end of the button switch elastic unit 555 contacts with one end of the button guide or the button guide holder, and the other end is supported by the circuit board unit or the like and connected to the button guide or the button guide holder so as to maintain restoration to an original position after pressure is applied to the button knob. That is, the button switch magnetic sensor 553 is disposed on the circuit board unit, and the other end of the button switch elastic unit 555 is disposed on the outer periphery of the button switch magnetic sensor 553. The button switch elastic unit 555 may be formed of a constituent element configuring an elastic behavior of a nonmetallic material in order to prevent signal errors of the button switch magnetic sensor 553.

Figure 17:
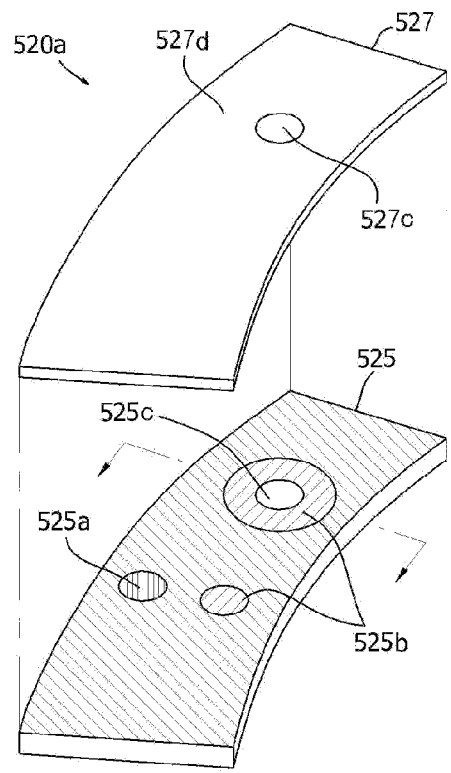
FIG. 17 is a schematic partially perspective view illustrating a button optical filter unit body of a button optical filter unit of a haptic steering wheel switch apparatus according to one embodiment of the present invention.
Figure 18:
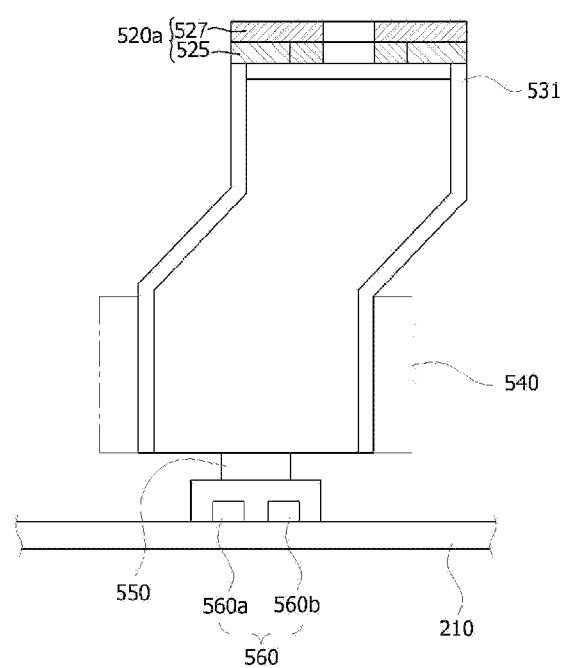
FIG. 18 is a partial cross-sectional view schematically illustrating a state of a button light source unit which transfers light through a button optical filter unit of a haptic steering wheel switch apparatus according to one embodiment of the present invention.
Figure 19:
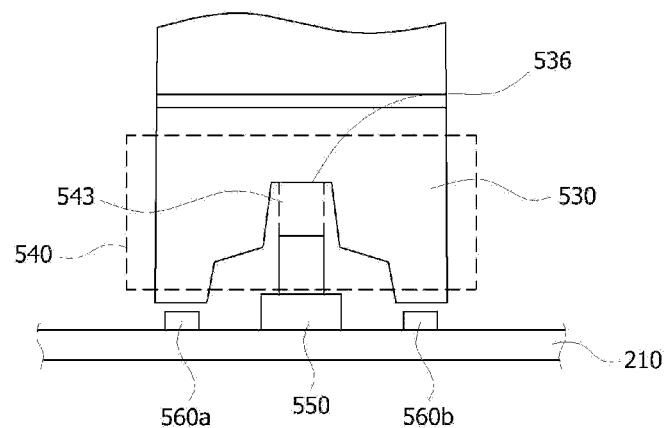
FIG. 19 is a schematic side cross-sectional view illustrating a button light source unit of a haptic steering wheel switch apparatus according to one embodiment of the present invention.

In addition, the button light source unit and the button optical filter unit described in the above embodiment may be configured as shown in FIGS. 17 to 21. If the button light source unit 560 is provided in plural numbers, a configuration providing a plurality of bridges can be adopted in order to stably transfer the light outputted from the button light source unit to the button optical filter unit. That is, as shown in FIGS. 18 and 19, the button light source unit 560 may include a first wavelength light source 560a and a second wavelength light source 560b. The first wavelength light source 560a outputs a first wavelength light, and the second wavelength light source 560b outputs a second wavelength light. The first wavelength light and the second wavelength light are implemented as lights of different wavelength bands. The button optical filter unit 520 selectively passes the first wavelength light or the second wavelength light and thus forms a structure capable of indicating a variable symbol by changing an output region of the light depending on the operation of the button light source unit 560, 560a and 560b.

Further specifically, the button optical filter unit 520 according to the embodiment includes a button screening filter unit 525 and a button translucent filter unit 527. The button screening filter unit 525 is disposed to face the button light source unit 560, and selectively allows passage of the first wavelength light or the second wavelength light, or passes or blocks both the first and second wavelength lights in a certain region. The button translucent filter unit 527 is positioned to dispose the button screening filter unit 526 between the button translucent filter unit 527 and the button light source unit 560 and changes the output region of the light depending on the first wavelength light or the second wavelength light passing through the button screening filter unit 525. The button screening filter unit 525 includes a button light total penetrating unit 525c, a button selective light penetrating unit 525a and 525b, and a button light total blocking unit 525d. The button light total penetrating unit 525c is formed in a region which passes both the first and second wavelength lights generated by the button light source unit 560, the button selective light penetrating unit 525a and 525b is formed in a region which passes either of the first wavelength light or the second wavelength light, and the button light total blocking unit 525d is formed in a region which blocks both the first and second wavelength lights.

The button light total blocking unit 525d denoted by reference numeral 525d blocks all the light outputted from the button light source unit 560 so that the light may not be transferred to the button translucent filter unit 527. The button light total penetrating unit 525c denoted by reference numeral 525c passes all the light outputted from the button light source unit 560 and transfers the light to the button translucent filter unit 527. The button selective light penetrating unit 525a denoted by reference numeral 525a passes the light outputted from the first wavelength light source 560a and blocks the light outputted from the second wavelength light source 560b, and the button selective light penetrating unit 525b denoted by reference numeral 525b passes the light outputted from the second wavelength light source 560b and blocks the light outputted from the first wavelength light source 560a.

The button translucent filter unit 527 includes a button symbol penetrating unit 527c and a button symbol expandable unit 527d. The button symbol penetrating unit 527c provides an at least partial intersecting projection region together with the button light total penetrating unit 525c and passes both the first and second wavelength lights. The button symbol expandable unit 527d is formed outside the button symbol penetrating unit 527c, and transmittance of the first and second wavelength lights is set to have a value smaller than the transmittance of the button symbol penetrating unit 527c. The transmittance of the button symbol expandable unit 527d has a value smaller than the transmittance of the button symbol penetrating unit 527c, and the transmittance of the button symbol expandable unit 527d preferably has a value as large as about 40% to 60% of the light transmittance of the button symbol penetrating unit 527c. By making the transmittance different as described above, visual sense of difference caused by difference in luminance of light can be minimized when a symbol (indication) recognizable by the driver is finally changed due to the change in the wavelength band of the light. In the embodiment described above, if the transmittance of the button symbol expandable unit 527d is less than 40% of the transmittance of the button symbol penetrating unit 527c, a considerable amount of the light is blocked, and thus rapid recognition of the driver can be disturbed. If the transmittance ratio is larger than 60%, the sense of difference of the outputted light can be easily confirmed for a common region and a selection region when the light outputted in different wavelength bands is changed, and thus it is preferable to select an appropriate ratio. The numbers are merely an example, and transmittance of light of the button symbol penetrating unit and the button symbol expandable unit can be properly adjusted depending on the difference in the output value of the button light source unit.

Figure 20:
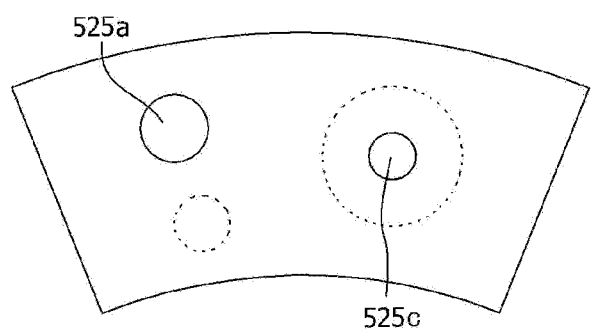
FIGS. 20 and 21 are diagrammatic views illustrating an operation state a button optical filter unit and a button light source unit of a haptic steering wheel switch apparatus according to one embodiment of the present invention.
Figure 21:
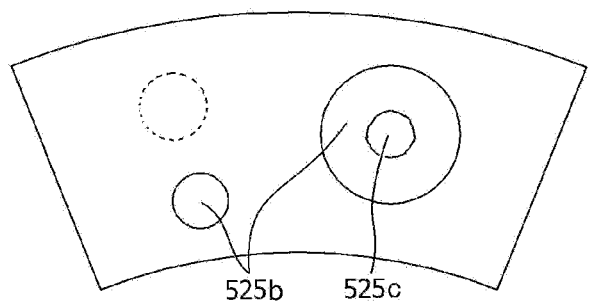

FIGS. 20 and 21 show an operation state of the button optical filter unit and the button light source unit having a structure shown in FIG. 17. Here, a region indicated using a solid line is a region where the light emitted from the button light source is cast, and a region indicated using a dotted line is a region where the light is selectively outputted. In addition, although it is indicated by a solid line between the regions denoted as reference numerals 525b and 525c in FIG. 21, this is merely to make it easy to understand the regions, and it does not express visual sense of difference since light of a color in the same wavelength band can be outputted.

If only the second wavelength light source 560b is formed to be on, the driver can see the symbol shown in FIG. 20, and if only the first wavelength light source 560a is formed to be on, the driver can see the symbol shown in FIG. 21. That is, if lights of the first wavelength light source 560a and the second wavelength light source 560b are selectively switched, a symbol recognized by the driver can be changed through the button optical filter unit 520, eventually through the button knob 510.

Figure 23:
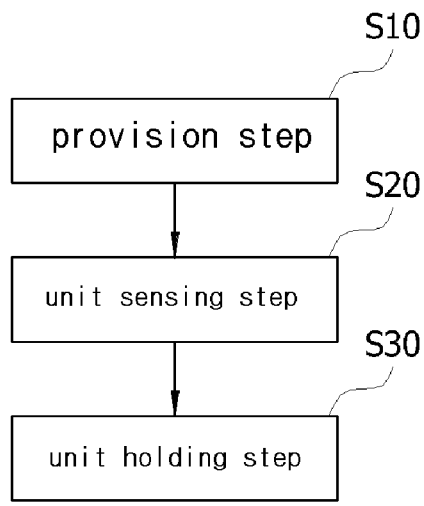
FIGS. 23 and 24 are flowcharts illustrating control flow of a haptic steering wheel switch apparatus according to one embodiment of the present invention.
Figure 24:
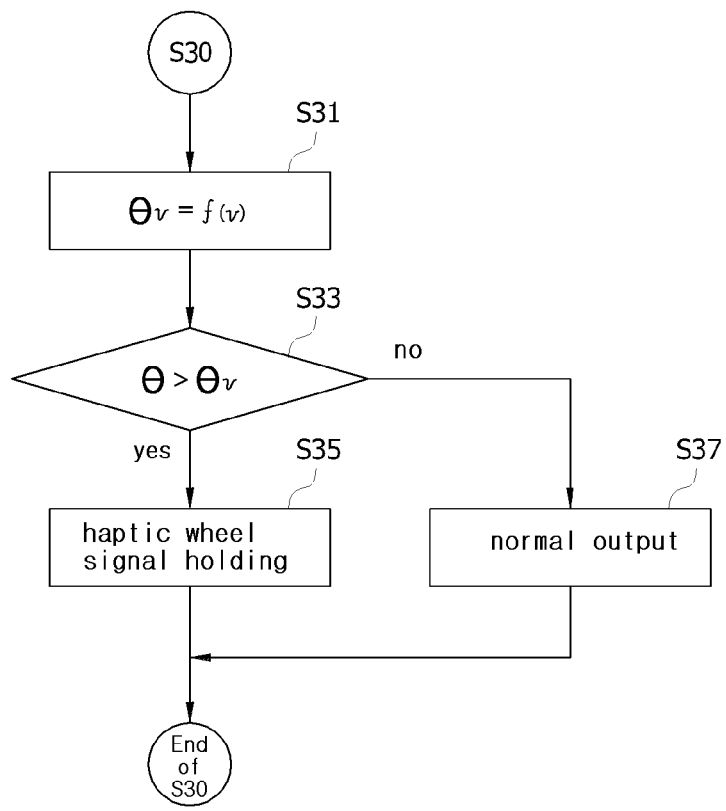

On the other hand, the haptic steering wheel switch apparatus of the present invention may prevent an error state using a steering angle of the steering wheel. That is, the haptic steering wheel switch apparatus may apply pressure to or rotate the haptic knob, the button knob or the like of the haptic steering wheel switch apparatus disposed on the steering wheel when the driver handles the steering wheel, due to the characteristic of being disposed on the steering wheel, and it is possible to have a configuration capable of preventing an error caused by undesired contacts to the haptic steering wheel switch apparatus when the driver handles the steering wheel. That is, as shown in FIGS. 23 and 24, the haptic steering wheel switch apparatus of the present invention performs a certain control step in order to block a mishandling signal of the haptic knob, the button knob or the like. That is, after performing the provision step S10 of providing the haptic steering wheel switch apparatus of the present invention, the control unit 20 performs the unit sensing step S20 for sensing a thumb-wheel operation of the haptic knob. In the unit sensing step S20, the control unit 20 senses certain sensing signals, i.e., electrical signals, from the haptic wheel device sensing unit 330, the button switch unit 500, the push switch unit 400 and the like. If a certain sensing signal is generated, the control unit 20 precedes the control flow to the unit holding step S30.

In the unit holding step S30, the control unit 20 receives a steering angle signal θ from a steering angle sensor (not shown), which senses whether or not the steering wheel of a vehicle is handled and an angle of the steering wheel, and receives a driving speed v of the vehicle from a vehicle speed sensor or a crank position sensor of the vehicle. Predetermined data stored in the storage unit 30 includes data on a steering determination reference angle θv corresponding to the driving speed v of the vehicle. The control unit 20 performs the steering determination reference angle calculating step S31 for calculating the steering determination reference angle θv of the vehicle using the inputted driving speed v of the vehicle. That is, the steering determination reference angle θv is formed as a function of driving speed, e.g., a function in the form of a logarithmic function or map data containing a diagram of such a type, and can be derived using an interpolation. The control unit 20 calculates a steering determination reference angle according to a driving speed of the vehicle through the operation of the arithmetic and logic unit 40 using steering determination reference angle data stored in the storage unit 30. Since the range of the steering angle of the driver is small if the driving speed of the vehicle is high, the steering determination reference angle θv for determining whether or not the steering wheel is handled has a small value, whereas since the range of variation of the steering angle for steering is larger than that of high-speed driving if the driving speed of the vehicle is low, the steering determination reference angle ev for determining whether or not the steering wheel is handled has a value smaller than that of the high-speed driving.

Then, the control unit 20 performs the steering state determination step S33. The control unit 20 determines whether or not the driver steers by comparing the steering angle signal θ inputted from the steering angle sensor of the vehicle with the steering determination reference angle θv calculated from the driving speed v of the vehicle. If it is determined that the steering angle signal θ is larger than the steering determination reference angle θv in step S33, the control unit 20 determines that the driver currently handles the steering wheel and the thumb-wheel or the button knob of the haptic steering wheel switch apparatus is not handled, and performs the unit signal holding step S35 for blocking execution of a certain operating mode according to an electrical signal received from the haptic wheel device sensing unit 330, the button switch unit 500 or the push switch unit 400.

On the other hand, if it is determined that the steering angle signal θ is smaller than the steering determination reference angle θv in step S33, the control unit 20 determines that the driver does not currently handle the steering wheel and the thumb-wheel or the button knob of the haptic steering wheel switch apparatus is handled, and performs the unit signal output step S35 for executing a certain operating mode according to an electrical signal received from the haptic wheel device sensing unit 330, the button switch unit 500 or the push switch unit 400.

The above embodiments are merely illustrative for the sake of describing the present invention, and are not intended to limit the present invention but can be constructed in various manners.

The haptic steering wheel switch apparatus according to the present invention as constructed above has the following advantageous effects.

First, the haptic steering wheel switch apparatus according to the present invention includes a two-axis rotation type haptic wheel device actuator so that a more compact and accurate rotation sensing structure can be achieved.

Second, the haptic steering wheel switch apparatus according to the present invention can implement the rotary operation and the push operation simultaneously through the haptic knob so that a compact construction and a more accurate operation can be achieved. In addition, a directional operation through the push switch unit can be implemented so that a simplified structure integrating the operated switches is provided, thereby facilitating the manufacture of the haptic steering wheel switch apparatus and remarkably reducing the manufacturing cost.

Third, the haptic steering wheel switch apparatus according to the present invention can a more simplified and combined switching function through the button switch unit disposed at the outside of the haptic knob.

Fourth, the haptic steering wheel switch apparatus according to the present invention can allow a driver to make a more rapid visual perception by outputting predetermined light in response to the switching operation through the light source unit disposed in the haptic knob or the button switch unit.

Fifth, the haptic steering wheel switch apparatus according to the present invention can implement a simplified and combined icon output function through the color filter, thereby achieving a combined function at low manufacturing cost.

Sixth, the haptic steering wheel switch apparatus according to the present invention allows the haptic wheel device actuator to be securely mounted so that the influence of a moment of inertia is minimized at the time manipulating the switch knob, thus facilitating the manipulation of the haptic knob.

Seventh, the haptic steering wheel switch apparatus according to the present invention can recognize a variable symbol through the button optical filter unit disposed in the button switch unit and thus may improve the manipulating property.

Eighth, the haptic steering wheel switch apparatus according to the present invention may prevent malfunctions caused by mishandling of the switch using information on a steering angle and thus may secure operation stability While the present invention has been described in connection with the exemplary embodiments illustrated in the drawings, it is merely illustrative and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

What is claimed is:

1. A haptic steering wheel switch apparatus comprising:
   A haptic wheel housing unit disposed on a steering wheel of a vehicle;
   A circuit board unit disposed in the haptic wheel housing unit,
   A haptic wheel device unit including a haptic wheel device actuator establishing an electrical connection with the circuit board unit and including a haptic shaft, a haptic knob connected to the haptic shaft and exposedly disposed on one surface of the haptic wheel housing unit, and a haptic wheel device sensing unit for detecting a rotating state of the haptic shaft,
   The haptic knob is rotatable on a plane formed by the steering wheel of the vehicle and is allowed to be pressed and movable in a vertical direction that is perpendicular to the plane,
   The haptic shaft is connected with the haptic knob, wherein, when the haptic knob rotates about a rotational axis, the haptic shaft rotates about the same rotational axis,
   According to a movement of the haptic knob in said vertical direction, the haptic wheel device actuator moves in said vertical direction,
   A button switch unit provided outside the haptic knob, the button switch unit operating vertically and independently of the haptic knob,
   Wherein the button switch unit further comprises a button light source unit disposed on the circuit board unit, and the button guide is formed of a light guide material,
   Wherein the button light source unit comprises a first wavelength light source for outputting a first wavelength light and a second wavelength light source for outputting a second wavelength light of a wavelength band different from a wavelength band of the first wavelength light, and the button switch unit further comprises a button optical filter unit for selectively passing the first wavelength light or the second wavelength light and indicating a variable symbol by changing an output region of light depending on an operation of the button light source unit.

2. The haptic steering wheel switch apparatus according to claim 1, wherein the button switch unit comprises:
   a button knob disposed outside the haptic knob which is disposed to expose one surface thereof to outside of the haptic wheel housing unit;
   a button guide, one end of which is disposed inside the button knob and the other end of which is disposed inside the haptic wheel housing unit toward the circuit board unit;
   a button guide holder attached to the button guide and disposed in the haptic wheel housing unit to be vertically moved together with the button guide; and a button switch including a button switch magnet disposed in the button guide holder, a button switch magnetic sensor disposed on one surface of the circuit board unit to be spaced apart from the button switch magnet, and a button switch elastic unit for elastically supporting the button guide.

3. The haptic steering wheel switch apparatus according to claim 1, wherein the button optical filter unit comprises:
   a button screening filter unit disposed to face the button light source unit and selectively allowing passage of the first wavelength light or the second wavelength light; and
   a button translucent filter unit positioned to dispose the button screening filter unit between the button translucent filter unit and the button light source unit and changing an output region of light depending on the first wavelength light or the second wavelength light passing through the button screening filter unit.

4. The haptic steering wheel switch apparatus according to claim 3, wherein the button screening filter unit comprises:
   a button light total penetrating unit for passing both the first wavelength light and the second wavelength light;
   a button selective light penetrating unit for passing either of the first wavelength light or the second wavelength light; and
   a button light total blocking unit for blocking both the first wavelength light and the second wavelength light.

5. The haptic steering wheel switch apparatus according to claim 3, wherein the button translucent filter unit comprises:
   a button symbol penetrating unit for providing an at least partial intersecting projection region together with the button light total penetrating unit and passing both the first wavelength light and the second wavelength light; and
   a button symbol expandable unit formed outside the button symbol penetrating unit, in which transmittance of the first wavelength light and the second wavelength light is smaller than transmittance of the button symbol penetrating unit.

6. The haptic steering wheel switch apparatus according to claim 1, further comprising:
   a control unit establishing an electrical connection with the circuit board unit and connected to the haptic wheel device unit and the button switch unit;
   a storage unit establishing an electrical connection with the control unit and storing predetermined data for a predetermined operating mode; and
   an arithmetic and logic unit electrically connected to the control unit and the storage unit and executing an arithmetic and logic process needed for a predetermined operating mode according to an arithmetic control signal of the control unit.

7. The haptic steering wheel switch apparatus according to claim 6, wherein the control unit determines whether or not to block a signal outputted from the haptic wheel device unit or the button switch unit based on signals received from a vehicle speed sensor for sensing a driving speed of the vehicle and a steering angle sensor for sensing a rotating angle of the steering wheel of the vehicle.

8. A haptic steering wheel switch apparatus comprising:
   A haptic wheel housing unit disposed on a steering wheel of a vehicle;
   A circuit board unit disposed in the haptic wheel housing unit;
   A haptic wheel device unit including a haptic wheel device actuator establishing an electrical connection with the circuit board unit and including a haptic shaft, a haptic knob connected to the haptic shaft and exposedly disposed on one surface of the haptic wheel housing unit, and a haptic wheel device sensing unit for detecting a rotating state of the haptic shaft,
   The haptic knob is rotatable on a plane formed by the steering wheel of the vehicle and is allowed to be pressed and movable in a vertical direction that is perpendicular to the plane,
   The haptic shaft is connected with the haptic knob, wherein, when the haptic knob rotates about a rotational axis, the haptic shaft rotates about the same rotational axis,
   According to a movement of the haptic knob in said vertical direction, the haptic wheel device actuator moves in said vertical direction,
   A button switch unit provided outside the haptic knob, the button switch unit operating vertically and independently of the haptic knob,
   Wherein the button switch unit further comprises a button light source unit disposed on the circuit board unit, and the button guide is formed of a light guide material,
   Wherein the button light source unit comprises a first wavelength light source for outputting a first wavelength light and a second wavelength light source for outputting a second wavelength light of a wavelength band different from a wavelength band of the first wavelength light, and the button switch unit further comprises a button optical filter unit for selectively passing the first wavelength light or the second wavelength light and indicating a variable symbol by changing an output region of light depending on an operation of the button light source unit.

9. The haptic steering wheel switch apparatus according to claim 1, wherein the button switch unit includes a button knob, and, when taken from a plan view, an entire outer circumference of the haptic knob is surrounded by the button knob.

10. The haptic steering wheel switch apparatus according to claim 1, the haptic wheel device actuator is configured to tilt depending on a movement of the haptic knob, such that, when the haptic knob is pressed to render a central region of the haptic knob not to be in a horizontal state, only one side of the haptic wheel device actuator moves downwardly.

11. The haptic steering wheel switch apparatus according to claim 8, the haptic wheel device actuator is configured to tilt depending on a movement of the haptic knob, such that, when the haptic knob is pressed to render a central region of the haptic knob not to be in a horizontal state, only one side of the haptic wheel device actuator moves downwardly.

* * * * *